US008045042B2

(12) United States Patent
Mogi

(10) Patent No.: US 8,045,042 B2
(45) Date of Patent: Oct. 25, 2011

(54) IMAGE ROTATING ADAPTER AND CAMERA HAVING THE SAME

(75) Inventor: Katsuya Mogi, Saitama (JP)

(73) Assignee: Fujinon Corporation, Saitama (JP)

( * ) Notice: Subject to any disclaimer, the term of this patent is extended or adjusted under 35 U.S.C. 154(b) by 497 days.

(21) Appl. No.: 12/334,027

(22) Filed: Dec. 12, 2008

(65) Prior Publication Data

US 2009/0167921 A1 Jul. 2, 2009

(30) Foreign Application Priority Data

Dec. 26, 2007 (JP) ................. P2007-335213
Mar. 25, 2008 (JP) ................. P2008-078019
Mar. 25, 2008 (JP) ................. P2008-078020

(51) Int. Cl.
*H04N 5/225* (2006.01)

(52) U.S. Cl. ................. 348/337; 348/333.07

(58) Field of Classification Search ............... None
See application file for complete search history.

(56) References Cited

U.S. PATENT DOCUMENTS

| | | | | |
|---|---|---|---|---|
| 3,945,713 | A * | 3/1976 | Doi et al. ........... | 359/423 |
| 4,482,234 | A * | 11/1984 | Takagi et al. ....... | 396/103 |
| 5,727,236 | A | 3/1998 | Frazier | |
| 6,185,044 | B1 | 2/2001 | Yoshikawa et al. | |
| 6,259,563 | B1 * | 7/2001 | Eckerl ............... | 359/625 |
| 6,471,637 | B1 * | 10/2002 | Green et al. ........ | 600/109 |
| 2003/0137582 | A1 | 7/2003 | Filous et al. | |
| 2003/0160888 | A1 * | 8/2003 | Yoshikawa ......... | 348/357 |
| 2005/0036036 | A1 * | 2/2005 | Stevenson et al. .. | 348/211.99 |

FOREIGN PATENT DOCUMENTS

| | | |
|---|---|---|
| JP | 55-1087 Y2 | 1/1980 |
| JP | 58-30283 A | 2/1983 |
| JP | 59-58975 A | 4/1984 |
| JP | 59-101632 A | 6/1984 |
| JP | 61-189789 A | 8/1986 |
| JP | 64-35534 A | 2/1989 |
| JP | 2-44185 B2 | 10/1990 |
| JP | 7-203466 A | 8/1995 |
| WO | WO-2007/016744 A1 | 2/2007 |

* cited by examiner

*Primary Examiner* — King Poon
*Assistant Examiner* — Vineet Lall
(74) *Attorney, Agent, or Firm* — Birch, Stewart, Kolasch & Birch, LLP

(57) ABSTRACT

An image rotating adapter includes: a first prism forming a subject image transmitted through an imaging lens on a position; and a second prism further reversing the subject image reversed by the first prism. The adapter also includes: a rotation drive unit rotating the second prism; a control unit controlling the rotation drive unit; a rotation instruction unit instructing the control unit to start or stop rotation; a target position setting unit previously setting one or more target positions to stop the second prism; a preset instruction unit instructing the control unit to perform a preset function for moving the second prism to the target position; a speed control unit adjusting rotation speed of the second prism; and a detection unit detecting a rotation position and a rotation direction of the second prism.

9 Claims, 16 Drawing Sheets

IMAGE ROTATING ADAPTER AND CAMERA HAVING THE SAME

CROSS-REFERENCE TO RELATED APPLICATIONS

This application is based on and claims priority under 35 USC 119 from Japanese Patent Application No. 2007-335213 filed Dec. 26, 2007, Japanese Patent Application No. 2008-078019 filed Mar. 25, 2008 and Japanese Patent Application No. 2008-078020 filed Mar. 25, 2008; the entire contents of which are incorporated herein by reference.

BACKGROUND

1. Technical Field

The present invention relates to an image rotating adapter, particularly, to an image rotating adapter that is mounted between an imaging lens and a camera to apply a special effect to an image taken by the camera, and to the camera having the image rotating adapter.

2. Related Art

Generally, a method of using a special filter has been known as a technique for applying a special effect to an image taken by a camera. In this method, striation of light is generated in a bright portion of a subject by inserting a special filter such as a cross, a snow cross, or a mirage in an optical path (for example, see Patent Documents 1 (JP-B-2-44185), Patent Document 2 (JP-A-64-35534), Patent Document 3 (JP-A-59-101632) and Patent Document 4 (JP-UM-B-55-1087)). In this case, the filters inserted in the optical path are exchanged by a turret mechanism.

Furthermore, as a technique for applying a special effect by rotating an image taken by a television camera, a technique for rotating an image pickup device provided in a television camera for every color separation prisms has been known (for example, see Patent Document 5 (JP-A-7-203466)).

However, in the method that applies a special effect to an image by using a special filter as disclosed in Patent Documents 1 to 4, filters are exchanged by using the turret mechanism, and thus a problem arises that the size of the whole system increases.

Furthermore, in the method that applies a special effect to rotate an image by rotating the image pickup device, a mechanism for rotating the image pickup device should be provided to the camera side, and thus a problem arises that the method can not be applied to a normal camera. In addition, the mechanism for rotating the image pickup device can be provided to the lens side, but in this case, a problem arises that the method can not be applied to a normal camera. When the mechanism for rotating the image pickup device is provided to the camera side, a problem arises that the camera increases in size or becomes complicated in structure. When the image pickup device is rotated, a problem also arises that noise occurs in a signal output from the image pickup device. In addition, even when the image pickup device is rotated, a problem also arises that an operation for setting the device at a target angle is complex.

Furthermore, in the known method that applies a special effect to rotate an image by rotating the image pickup device as described above, when an erecting position is stored by a compulsory erecting function or a preset function, in the past, a photographer sets the erecting position by himself while observing an image. However, in this case, when a camera is tilted by any reason that a tripod stand tilts, a steady cam is used, or the like, a problem arises that the position of the camera is deviated from the erecting position.

In addition, when a position other than the erecting position is stored by the preset function, the position is set by reference to an erected image. Thus, when the camera tilts, the problem arises that the preset position is also deviated depending on the tilt.

Furthermore, in the method that applies a special effect to rotate an image by rotating the image pickup device, sometimes a subject may be observed by operating a camera in a state where the image is not erected or during rotation. For example, a subject image rotated by 180 degrees may be displayed on a viewfinder of a camera. In this case, although the situation as shown in FIG. 17A is photographed in practice, the image shown in FIG. 17B is actually displayed on the viewfinder. At this time, when an operator wants to operate the camera while observing an image of the viewfinder, practically the operator photographs the situation as shown in FIG. 17A. Thus, when the operator wants to move the subject to the center of a screen or to zoom the subject, the camera should be moved in a right direction but, the image as shown in FIG. 17B is displayed on the viewfinder. Thus, there is a possibility that the operator may erroneously move the camera in a left direction.

As described above, when the image rotated differently from the real situation of the photographed subject is being displayed on the viewfinder of the camera, a problem arises that the operator may erroneously operate the camera.

The present invention has been made in consideration of these situations, and its object is to provide an image rotating adapter capable of applying a special effect to a photographed image by using a normal camera and a normal imaging lens.

Furthermore, in a camera having an effect that rotates an image by rotating a prism, even when the camera tilts, its object is to provide an image rotating adapter capable of stopping a subject image at a precise position.

In addition, its object is to provide a camera having an image rotating adapter capable of preventing an erroneous operation by an operator when the operator operates the camera while observing a viewfinder.

SUMMARY

According to an aspect of the invention, An image rotating adapter, a camera that includes a camera body, a imaging lens detachably mounted to the camera main body, the image rotating adapter detachably mounted between the imaging lens and the camera main body, where a subject image passing through the imaging lens is formed on a light receiving surface of an image pickup device through a prism built in the camera main body, and the image rotating adapter rotates the subject image formed on the light receiving surface of the image pickup device, the image rotating adapter includes a first prism, a second prism, a relay optical system, a rotation drive unit, a control unit, a rotation instruction unit, a target position setting unit, a preset instruction unit and a detection unit. The first prism has an optical path length approximate to the optical path of the prism built in the camera main body. The first prism is disposed in an optical path before the subject image passing through the imaging lens is formed on a position in the image rotating adapter. And the first prism reflects subject light passing through the imaging lens odd number of times, and reverses the subject image passing through the imaging lens. The second prism has the incident optical axis and the exit optical axis formed on the same axis. The second prism is disposed on an optical axis of the subject light after the subject image is formed once through the first prism, the second prism is supported to freely rotate around the optical axis. And the second prism reflects the subject light passing through the first prism odd number of times and further reverses the subject image reversed by the first prism. The relay optical system forms again the subject image passing through the second prism on the light receiving surface of the image pickup device. The rotation drive unit rotates the second prism. The control unit controls the rotation drive unit. The rotation instruction unit instructs the control unit to start or stop rotation. The target position setting unit previously sets one or more target positions to stop the second prism. The preset instruction unit instructs the control unit to perform a preset function for moving the second prism to the target position. And the detection unit detects a rotation position and a rotation direction of the second prism. The control unit performs a position control to move the second prism to the target position by the rotation drive unit based on the detection result of the detection unit when being instructed to perform the preset function.

With such a configuration, the image rotating adapter is mounted between the imaging lens and the camera main body, and the control unit controls the rotation drive unit to rotate the second prism. Then, the subject image formed on the light receiving surface of the image pickup device is rotated around the optical axis, and the preset function is performed additionally. Thereby, it is possible to move the second prism to the target position set previously without complex operations.

According to the aspect of the invention, the image rotating adapter further includes a speed control unit that adjusts a rotation speed of the second prism. The speed control unit is adapted to adjust rotation speed when the second prism moves to the target position.

With such a configuration, the rotation speed of the prism is adjusted. Thereby, it is possible to freely change special effects for photographing.

According to the aspect of the invention, the control unit performs the position control to stop the second prism at the target position by rotating in a direction of a shortest distance when being instructed to perform the preset function during stop of the second prism. The control unit performs the position control to stop the second prism at the target position while keeping the rotation direction of the second prism when being instructed to perform the preset function during rotation of the prism.

With such a configuration, it is possible to smoothly move and stop the second prism at the target position.

According to the aspect of the invention, the control unit performs the position control to keep the rotation speed of the second prism when the preset function is performed during rotation of the second prism.

With such a configuration, the rotation speed does not change even when the preset function is performed during rotation of the second prism. Thus, it is possible to obtain an image free from a sense of incongruity.

According to the aspect of the invention, the speed control unit is adapted to adjust the rotation speed of the second prism during rotation of the second prism or during operation of the preset function.

With such a configuration, in most of cases, it is possible to obtain a sufficient special effect.

According to the aspect of the invention, the image rotating adapter further includes: a compulsory erecting instruction unit instructing the control unit to perform a compulsory erecting function for compulsorily moving the second prism to an erecting position at which the subject image is erected; and an erecting position setting unit previously setting the erecting position. In the adapter, the control unit performs the position control to move the second prism to the erecting position when being instructed to perform the compulsory erecting function, and the compulsory erecting position is able to be updated.

With such a configuration, even when not only the image is being rotated but also the camera tilts, it is possible to easily obtain an erected image of the subject.

According to the aspect of the invention, the image rotating adapter further includes a tilt sensor sensing tilt of the camera main body. In the adapter, the control unit is adapted to correct the set erecting position when tilt of the camera main body is detected.

With such a configuration, even when not only the image is being rotated but also the camera tilts, it is possible to correct the set erecting position and to easily obtain the erected image of the subject.

According to the aspect of the invention, a camera includes the image rotating adapter mentioned above, a viewfinder displaying a taken image formed on the light receiving surface of the image pickup device of the camera main body. The camera also includes a display mechanism performing display on the viewfinder by combining or changing the subject image with the taken image. The subject image is incident on the imaging lens before being incident on the image rotating adapter. In the camera, the subject image before being incident on the image rotating adapter is combined or changed with the taken image to be displayed on the viewfinder.

With such a configuration, the image erected before rotation is combined or changed with the taken image to be displayed on the viewfinder. Thus, it is possible to prevent that an operator performs an erroneous operation caused by the displayed image.

According to the aspect of the invention, the display mechanism performing display on the viewfinder includes an optical system extracting the subject image incident on the imaging lens before the subject image is incident on the image rotating adapter and a super impose section superimposing the subject image extracted by the optical system on the taken image.

With such a configuration, the image before rotation is superimposed and displayed on the viewfinder. Hence, an operator can operate the camera while observing the image erected continuously. Therefore, it is possible to prevent an erroneous operation.

As described above, the image rotating adapter according the aspect of the invention is mounted between the imaging lens and the camera main body, and the control unit controls the rotation drive unit to rotate the second prism. Then, the subject image formed on the light receiving surface of the image pickup device is rotated around the optical axis, and the preset function is performed additionally. Thereby, it is possible to move the second prism to the target position set previously without complex operations. In addition, it is possible to obtain a sufficient special effect for photographing without complex operations. Furthermore, even when not only the image is being rotated but also the camera tilts, it is possible to correct the set erecting position and to easily obtain the erected image of the subject. Moreover, at this time, the image erected before rotation is combined or changed with the photographed image to be displayed on the viewfinder. Thus, it is possible to prevent that an operator performs an erroneous operation caused by the displayed image.

DETAILED DESCRIPTION

Hereinafter, the image rotating adapter according to embodiments of the invention will be described in detail with reference to the attached drawings.

Figure 1A:
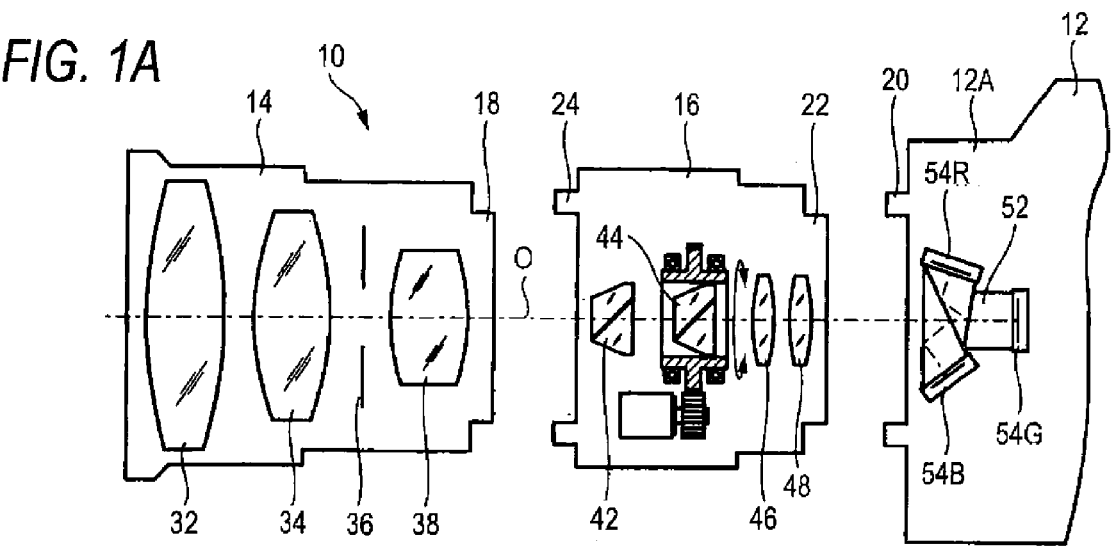
FIGS. 1A, 1B and 1C are system configuration diagrams illustrating a TV camera system.
Figure 1B:
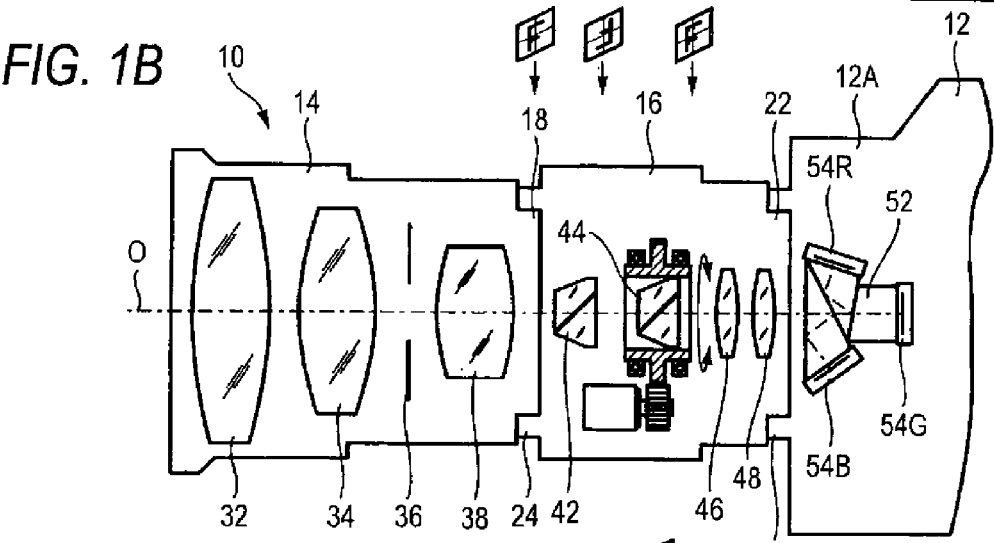
Figure 1C:
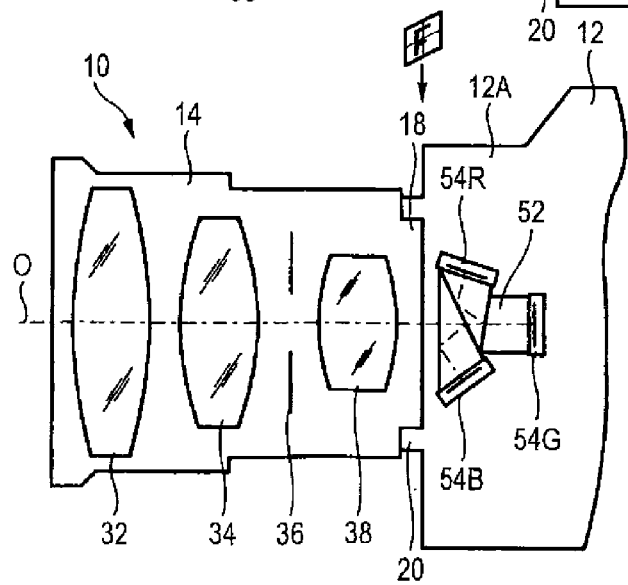

FIGS. 1A to 1C are system configuration diagrams illustrating a television camera system equipped with an image rotating adapter according to an embodiment of the invention.

As shown in FIG. 1A, the television camera system 10 includes a television camera 12, a imaging lens 14, and an image rotating adapter 16.

The image rotating adapter 16 is an adapter for rotating an image taken by the television camera 12 and applying a special effect to the image, and is mounted between the television camera 12 and the imaging lens 14 as the need arises. Specifically, as shown in FIG. 1B, when an image is intended to be rotated for a special effect, the image rotating adapter 16 is mounted between the television camera 12 and the imaging lens 14. In contrast, when special effect photographing is not performed, the adapter is detached from the television camera 12. Accordingly, when special effect photographing is not performed, the imaging lens 14 is directly mounted on the television camera 12 as shown in FIG. 1C.

Furthermore, the imaging lens 14 has a lens side mount 18 provided on the tail end thereof, and is mounted on a camera main body 12A by attaching the lens side mount 18 to the camera side mount 20. The camera side mount 20 is provided on the leading end of the camera main body 12A of the television camera 12.

The image rotating adapter 16 has a rear side mount 22 provided on the tail end thereof with the same configuration as the lens side mount 18. The adapter is configured to be mountable on the television camera 12 by attaching the rear side mount 22 to the camera side mount 20 of the television camera 12.

Furthermore, on the leading end of the image rotating adapter 16, a front side mount 24 having the same configuration as the camera side mount 20 is provided. The imaging lens 14 is configured to be mountable on the image rotating adapter 16 by attaching the lens side mount 18 of the imaging lens 14 to the front side mount 24.

Figure 2:
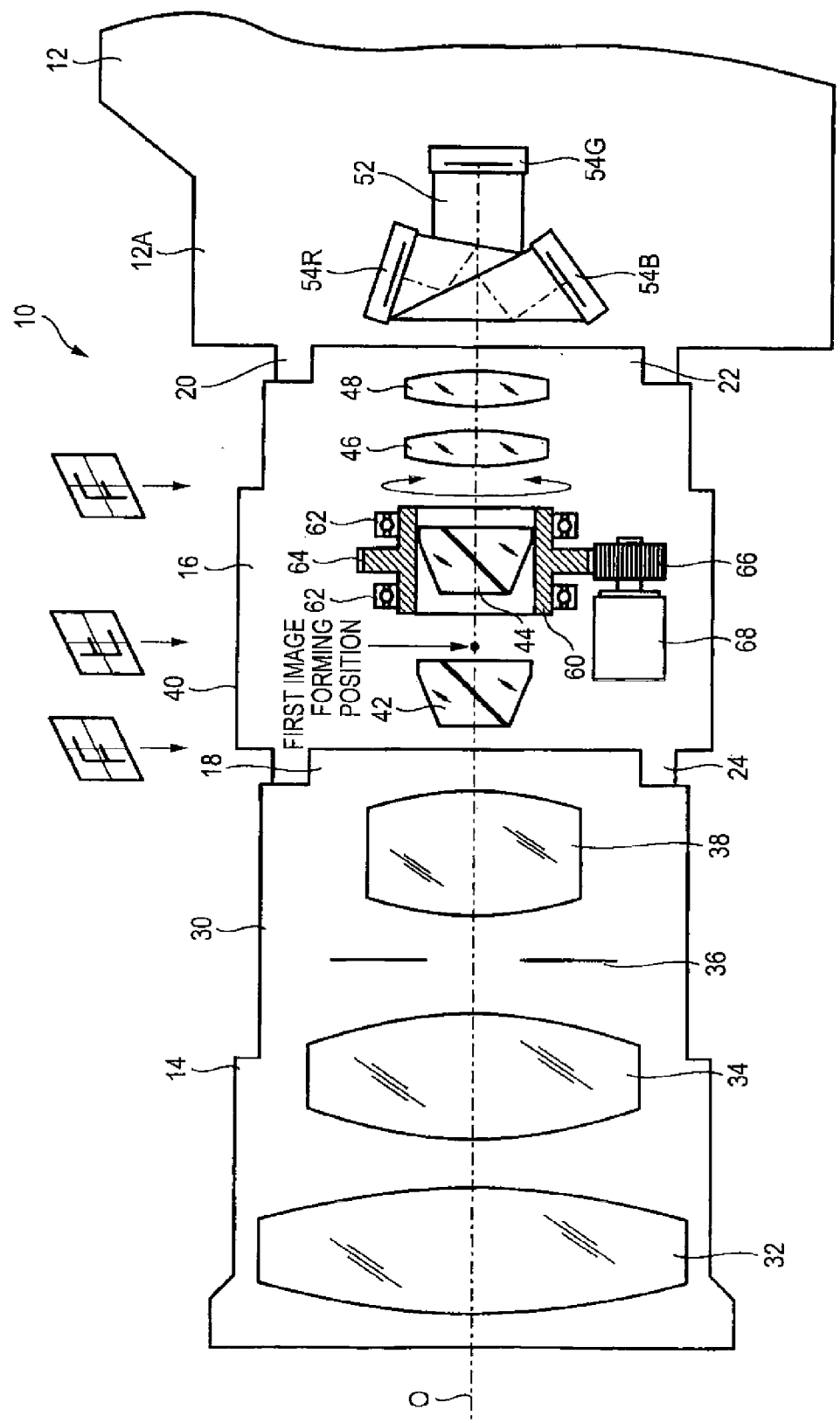
FIG. 2 is a schematic configuration diagram illustrating an optical system of the television camera system.

FIG. 2 is a schematic configuration diagram illustrating an optical system in the television camera system 10 shown in FIGS. 1A to 1C.

Furthermore, each lens configuration in the drawing is schematically shown, and some lens groups formed of a plurality of lenses may be illustrated as one lens.

As shown in FIG. 2, in a lens barrel 30 of the imaging lens 14, there are arranged in order from the front side, a focus lens 32, a zoom lens 34, an iris 36, and a relay lens 38. A subject light incident from the leading of the imaging lens 14 is transmitted through the lenses to exit from the tail end of the imaging lens 14.

In a casing 40 of the image rotating adapter 16, a first prism 42, a second prism 44, a first relay lens 46, and a second relay lens 48 are arranged along an optical axis O of the imaging lens 14. The subject light exiting from the rear end of the imaging lens 14 travels along the optical axis O of the imaging lens 14. The subject light is transmitted 16 through the first prism 42, the second prism 44, the first relay lens 46, and the second relay lens 48 to exit from the rear end of the image rotating adapter 16.

In the camera main body 12A of the television camera 12, a color separation prism 52 is disposed on the optical axis O of the imaging lens 14. The subject light exiting from the rear end of the image rotating adapter 16 is separated into rays of color components R (red), G (green), and B (blue) by the color separation prism 52. Then, the separated rays of the color components of the subject are incident on light receiving surfaces of image pickup devices 54R, 54G, and 54B for the color components, respectively. The subject light and incident on the light receiving surfaces of the image pickup devices 54R, 54G, and 54B is converted into electric signals in the image pickup devices 54R, 54G, and 54B. Subsequently, the electric signals are processed by well known image signal processing, and are output as image signals or recorded in a recording medium.

Figure 3:
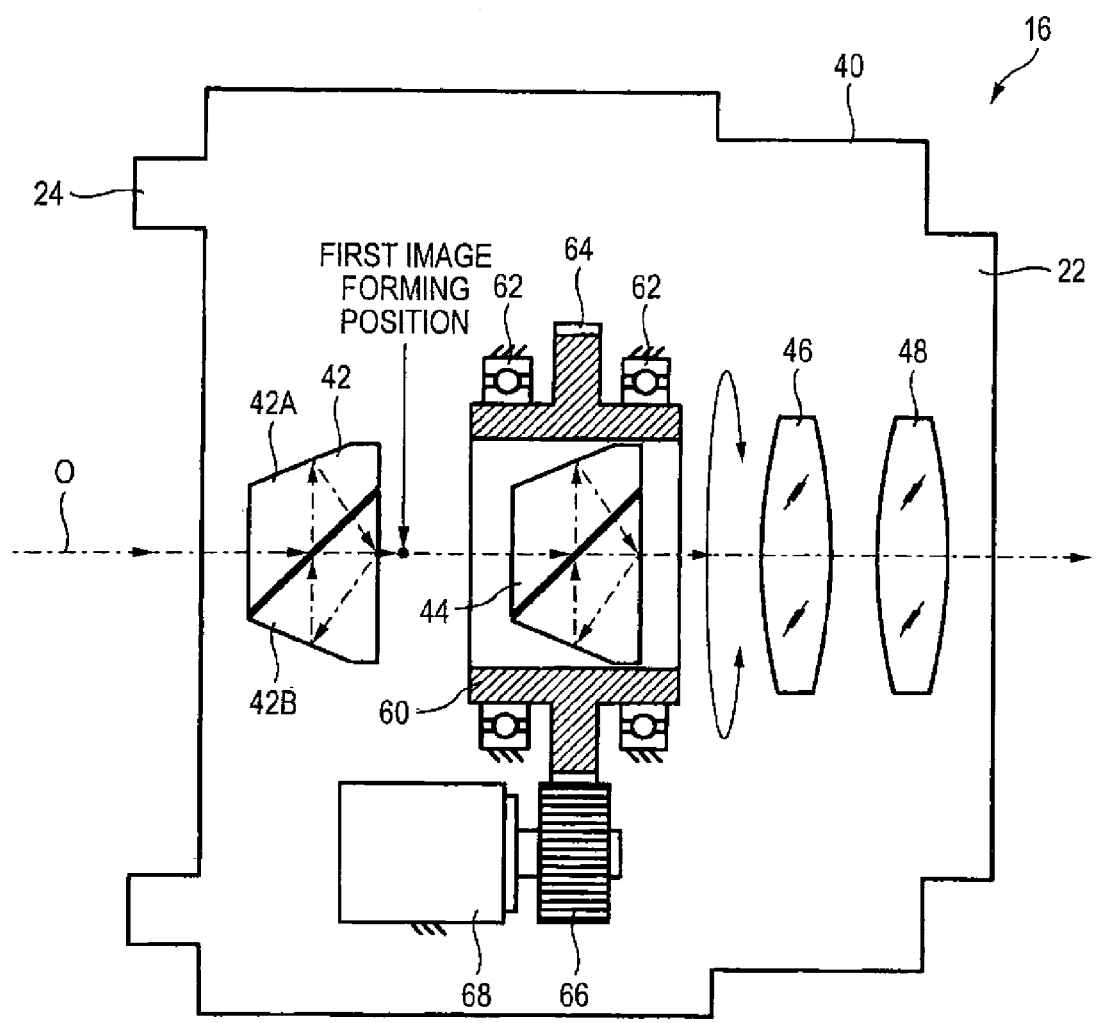
FIG. 3 is a schematic configuration diagram illustrating an image rotating adapter according to an embodiment.

FIG. 3 is a schematic configuration diagram illustrating an image rotating adapter according to an embodiment of the invention.

As described above, in the casing 40 of the image rotating adapter 16, the first prism 42, the second prism 44, the first relay lens 46, and the second relay lens 48 are arranged along an optical axis O of the imaging lens 14. The subject light exiting from the rear end of the imaging lens 14 is transmitted through the first prism 42, the second prism 44, the first relay lens 46, and the second relay lens 48 to exit from the rear end of the image rotating adapter 16.

The casing 40 is formed in a cylinder shape. On the front end side, the front side mount 24 is formed. On the rear side end, the rear side mount 22 is formed.

The first prism 42 is formed as a Pechan prism, is held by a holder not shown in the drawing, and is fixed on the optical axis O of the imaging lens 14.

Figure 4:
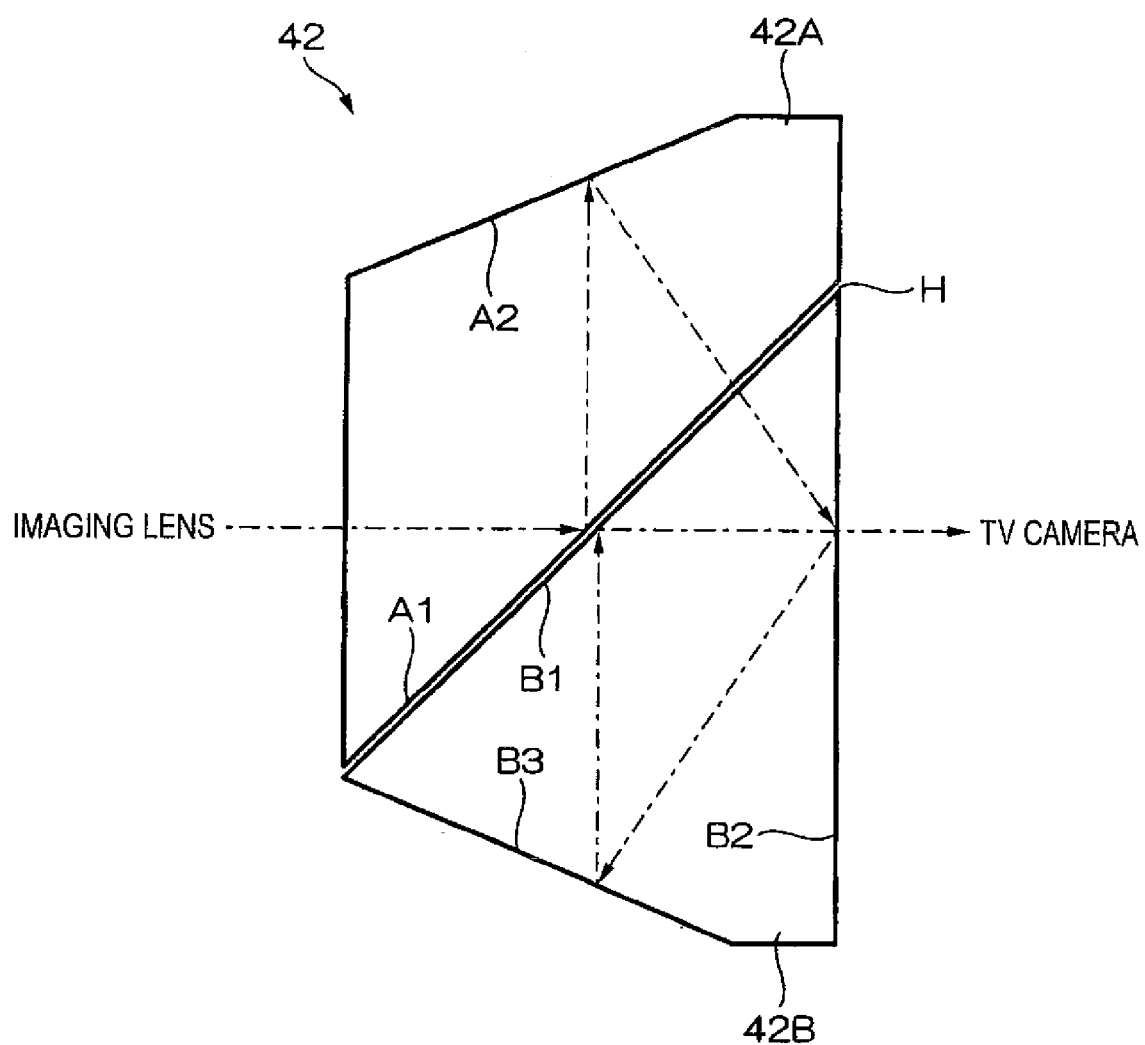
FIG. 4 is a schematic configuration diagram illustrating a first prism (a second prism).

The Pechan Prism is one prism type that triangular prisms are disposed facing to each other with a thin air gap interposed therebetween. In the Pechan prism, an optical path the same as that shown in FIG. 4 is formed. Specifically, the light incident on a first triangular prism 42A through the imaging lens 14 is reflected on a surface A1. Then, the light is reflected on a surface A2, and exits from the surface A1 to an air gap H. The light exiting to the air gap H is incident on a surface B1 of a second triangular prism 42B, and is reflected on the surface B2. Subsequently, the light is reflected on a surface B3 and the surface B1, and exits from the surface B2. At this time, the exiting light exits along the optical axis O.

As described above, in the first prism 42 formed as a Pechan prism 42, the light incident along the optical axis O is reflected five times, and thereby exits along the optical axis O. In addition, since the number of reflection is odd, a reversed image of the subject is obtained.

Furthermore, in the first prism 42, an optical path length thereof is formed to have the same length as an optical path length of the color separation prism 52 built in the camera main body 12A.

The image of subject light exiting from the first prism 42 is preliminarily formed between the first prism 42 and the second prism 44 in a state where the image is in focus, and subsequently the subject light is incident on the second prism 44. Hereinafter, the position at which the subject image is formed between the first prism 42 and the second prism 44 is referred to as a first image forming position.

Here, as described above, the first prism 42 is formed to have the same optical path length as the color separation prism 52 built in the camera main body 12A. Hence, in an image formed at the first image forming position, assumed aberrations of the imaging lens 14 is considered.

Specifically, in consideration of existence of the color separation prism 52, such aberrations of the imaging lens 14 is reflected in a design of the television camera 12 having the color separation prism 52 disposed in the camera main body 12A. Accordingly, by making the optical path length of the first prism 42 equal to the optical path length of the color separation prism 52, it is possible to form a fine image at the first image forming position in consideration of aberrations and the like.

The second prism 44 is also formed as a Pechan prism similarly to the first prism 42, and is disposed on the optical axis of the subject light exiting from the first prism 42. In the example, the first prism 42 is formed as a Pechan prism, and the incident optical axis and the exit optical axis are formed on the same axis. Thus, the second prism 44 is also disposed on the optical axis O of the imaging lens 14 in the same shape as the first prism 42.

Furthermore, the second prism 44 is also formed as a Pechan prism similarly to the first prism 42. Thereby, the subject light incident on the second prism 44 is reflected five times inside the prism, and exits along the optical axis O. Since the number of reflection is odd, a reversed image of the subject is obtained.

Here, the image reversed by the first prism 42 is incident on the second prism 44, and the reversed image is further reversed by the second prism 44. Thus, the image is returned to its original state. Specifically, the image exiting from the second prism 44 is the same as the image (which is the image incident on the first prism 42) exiting from the imaging lens 14.

As described above, the second prism 44 reflects the image reversed by the first prism 42 odd number of times to reverse the image again, and thus has a function of returning the image to its original state.

As shown in FIG. 3, the second prism 44 is held by a prism holder 60, and is disposed on the optical axis O of the imaging lens 14.

The prism holder 60 is formed in a cylindrical shape, and the second prism 44 is housed in an inner peripheral portion thereof to be held. The prism holder 60 is supported to freely rotate about the optical axis O by a bearing 62 provided in the casing 40. The second prism 44 rotates about the optical axis O by rotating the prism holder 60.

On the outer periphery of the prism holder 60, a gear 64 is integrally formed. The gear 64 meshes with the driver gear 66. The driver gear 66 is connected to an output shaft of a prism rotation drive motor 68 provided in the casing 40, and rotates forward or reverse by driving the prism rotation drive motor 68. By rotating the drive gear 66, the prism holder 60 rotates, and the second prism 44 rotates about the optical axis O.

As described above, the second prism 44 rotates about the optical axis O by driving the prism rotation drive motor 68. In addition, by rotating the second prism 44 about the optical axis O, the subject image exiting from the second prism 44 rotates about the optical axis O. A rotation speed of the subject image is two times a rotation speed of the second prism 44. Specifically, when the second prism 44 rotates by 45 degrees, the image exiting from the second prism 44 rotates by 90 degrees. In addition, when the second prism 44 rotates by 90 degrees, the image exiting from the second prism 44 rotates about 180 degrees.

Furthermore, a control system for controlling the drive of the prism rotation drive motor 68 will be described in detail later.

The subject light exiting from the second prism 44 is transmitted through the first relay lens 46 and the second relay lens 48, and exits from the image rotating adapter 16.

The first relay lens 46 and the second relay lens 48 constitute a relay optical system. The lenses focus the subject light exiting from the second prism 44 and form the image of the subject light on the light receiving surfaces of the image pickup devices 54R, 54G, and 54B built in the camera main body 12A.

Thereby, on the right receiving surfaces of the image pickup devices 54R, 54G, and 54B, the same subject image is formed no matter whether the image rotating adapter 16 is mounted or not.

Figure 5:
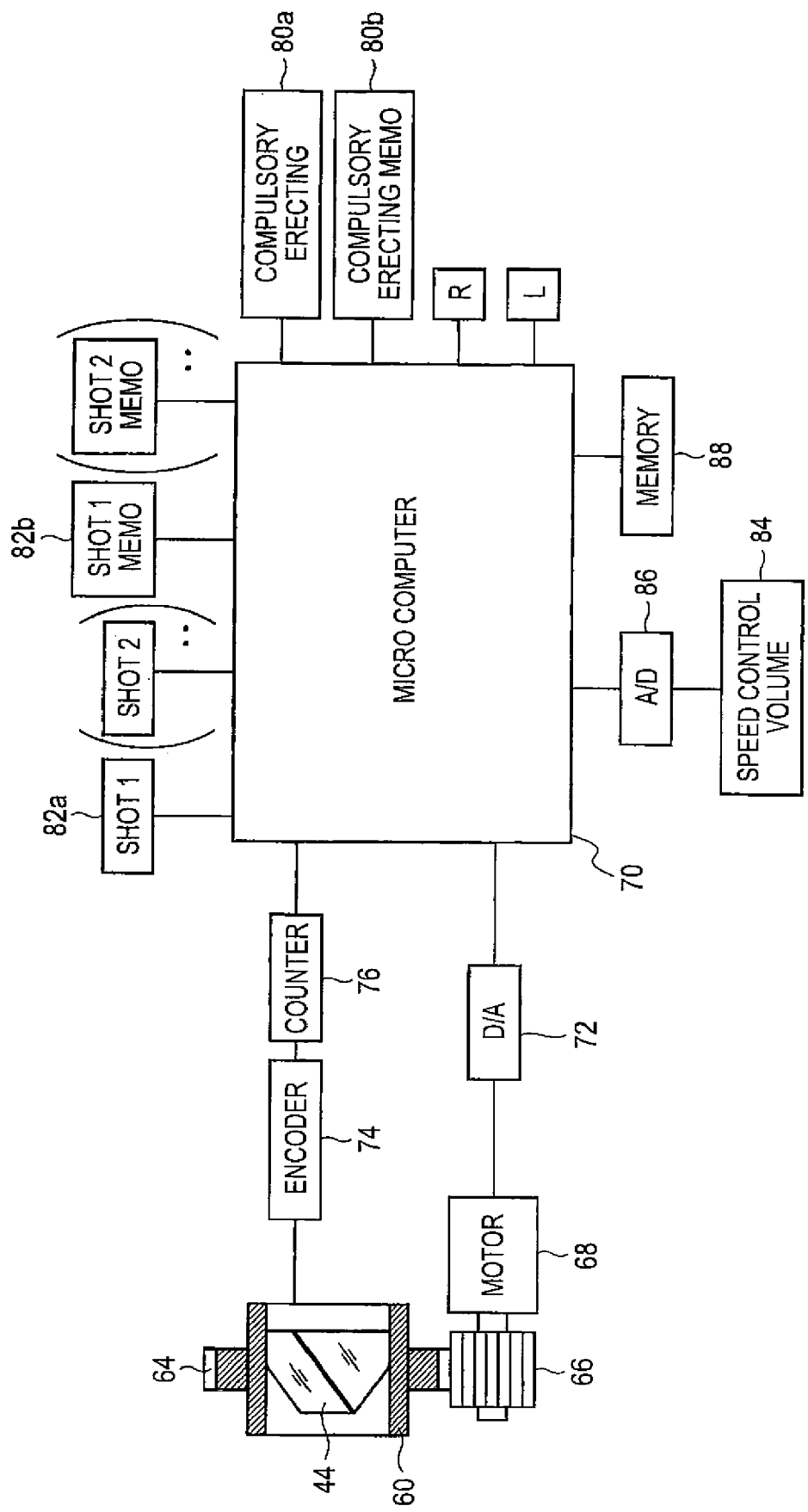
FIG. 5 is a schematic block diagram illustrating a rotation drive control system for rotating the second prism around an optical axis according to a first embodiment.

FIG. 5 schematically shows a rotation drive control system for rotating the second prism 44 about the optical axis O.

As shown in FIG. 5, the prism rotation drive motor 68 for rotating the second prism 44 is controlled by the microcomputer 70. The microcomputer 70 sends a drive signal to the prism rotation drive motor 68 through a D/A (a digital/analog converter) 72 to control the rotation drive.

Furthermore, the prism rotation drive motor 68 is provided with an encoder 74. Signals detected by the encoder 74 are counted by the counter 76, and are output to the microcomputer 70 as rotation position information of the output shaft. In addition, in the embodiment, one rotation cycle (0° to 360°) is represented as digital values in the range from 0 to 4095, and the rotation drive is controlled by detecting a direction and a position of rotation of the second prism 44.

Furthermore, various operation buttons (operation switches) is provided to input signals for instructing the microcomputer 70 on various controls. For example, provided are a right rotation button R for instructing a rightward rotation (a positive rotation, a clockwise rotation); a left rotation button L for instructing a leftward rotation (a negative rotation, an counterclockwise rotation); a compulsory erecting button (reset button) 80*a* for compulsorily recovering the erecting position (at which the subject image is erected); a shot button (SHOT1) 82*a* for performing the so-called preset function of rotating and stopping at the preset target position (a shot position); and further a compulsory erecting position setting button (COMPULSORY ERECTING MEMO) 82*b* and a shot position setting button (SHOT1 MEMO) 82*b* for setting the compulsory erecting position and the target position (a shot position) for the compulsory erecting button 80*a* and the shot button 82*a*, respectively.

In addition, to be able to set not only one target position but also plural target positions, it is preferred that plural shot buttons and plural shot position setting buttons such as SHOT2, SHOT2 MEMO, and the like be provided. However, to simplify the following description for a specific control using a flowchart to be mentioned later, hereinafter the number of shot button is regarded as one in the description.

Moreover, also provided are a speed control volume 84 for setting/adjusting a rotation speed; a A/D (an analog/digital converter) 86 for converting an analog signal input from the speed control volume 84 into a digital signal and inputting it to the microcomputer 70; and a memory 88 for storing the target position and the compulsory erecting position set previously and storing a control program executed by the microcomputer 70.

Furthermore, when the right rotation button R is pressed in a state where the second prism is stopped, the second prism 44 begins to rotate rightward. In addition, when the button R is pressed again, the right rotation is stopped. As described above, when the right rotation button R is pressed once, the right rotation continues even when the button is not being pressed. Thus, an operator's hand becomes free from the button after the button is pressed since the operator's hand can be removed from the button. Furthermore, when the right rotation button R is pressed during right rotation, the rotation is stopped, and when the right rotation button R is pressed during left rotation, the right rotation is performed. This manner can be similarly applied to the left rotation button L.

Here, by using a seesaw switch instead of these buttons, it is possible to switch the right rotation and the left rotation, and it is also possible to perform rotation while the switch is pressed and to stop the rotation when an operator's hand is removed from the switch. However, in the case of using the seesaw switch, the switch should continue to be pressed by an operator's hand during rotation, and thus a problem arises that the operator's hand can not be removed. Accordingly, in the embodiment, there are provided a button (a switch) for starting/stopping the rotation by changing with the seesaw switch, and a volume for adjusting a rotation speed. Thereby, it is possible to make an operator's hand free even during rotation, and it may be convenient for a cameraman.

As described above, the image rotating adapter 16 is used when a special effect used in photography is needed. Accordingly, when special effect photography is not needed, photographing is performed by directly mounting the imaging lens 14 on the camera main body 12A as shown in FIG. 1C. In this case, the light transmitted through the imaging lens 14 is directly incident on the camera main body 12A, and is received by the image pickup devices 54R, 54G, and 54B through the color separation prism 52. Furthermore, it is possible to perform normal photographing while mounting the image rotating adapter 16.

On the other hand, when photographing using a special effect that is operable to rotate an image as the need arises is performed, photographing is performed by mounting the image rotating adapter 16 between the imaging lens 14 and the camera main body 12 as shown in FIG. 1B.

When the image rotating adapter 16 is mounted, the light transmitted through the imaging lens 14 is received by the image pickup devices 54R, 54G, and 54B through the image rotating adapter 16. Specifically, the light transmitted through the imaging lens 14 enters in the image rotating adapter 16, passes through the first prism 42, the second prism 44, the first relay lens 46, and the second relay lens 48, and exits to the television camera 12.

At this time, the subject light is reflected inside the first prism 42 five times to exit along the optical axis O when passing through the first prism 42. With such a configuration, the image of the subject light is reversed.

The subject light passing through the first prism 42 is preliminarily imaged at the first image forming position, and subsequently is incident on the second prism 44. Then, the subject light is reflected five times in the second prism 44, and exits therefrom along the optical axis O. With such a configuration, the reversed image is reversed again, and is returned to its original state.

The subject light passing through the second prism 44 is transmitted through the first relay lens 46 and the second relay lens 48 constituting the relay optical system, and exits from the image rotating adapter 16. Then, the subject light exiting from the image rotating adapter 16 is imaged on the light receiving surfaces of the image pickup devices 54R, 54G, and 54B through the color separation prism 52 of the television camera 12.

The subject images formed on the light receiving surfaces of the image pickup devices 54R, 54G, and 54B are rotated about the centers of the image pickup devices 54R, 54G, and 54B by rotating the second prism 44.

A rotation speed of each subject image formed on the light receiving surfaces of the image pickup devices 54R, 54G, and 54B is two times a rotation speed of the second prism 44. Specifically, when the second prism 44 is rotated once, each subject image formed on the image pickup devices 54R, 54G, and 54B is rotated two times. Accordingly, when the second prism 44 is rotated by 90 degrees, each subject image formed on the image pickup devices 54R, 54G, and 54B is rotated by 180 degrees.

The rotation of the second prism 44 is operated by the right rotation button R or the left rotation button L, and the rotation of the second prism 44 is driven on the basis of an input of the right rotation button R or the left rotation button L. For example, when the right (positive) rotation button is operated (pressed), an operation signal thereof is input to the microcomputer 70. The microcomputer 70 outputs a drive signal based on the operation signal, and drives the prism rotation drive motor 68 to rotate rightward. Thereby, the second prism 44 is rotated rightward (a frontward rotation, a clockwise rotation) at a given rotation speed (a rotation speed set by the speed control volume 84). Therefore, the subject images formed on the image pickup devices 54R, 54G, and 54B are rotated rightward. Conversely, when the left rotation button L is operated (pressed), an operation signal thereof is input to the microcomputer 70. The microcomputer 70 outputs a drive signal based on the operation signal, and drives the prism rotation drive motor 68 to rotate. Thereby, the second prism 44 is rotated leftward (a reverse rotation, an anticlockwise rotation) at a given rotation speed. Therefore, the subject images formed on the image pickup devices 54R, 54G, and 54B are rotated leftward.

As described above, when the right rotation button R or the left rotation button L is operated, the second prism 44 rotates, and each subject image formed on the image pickup devices 54R, 54G, and 54B rotates.

Furthermore, the second prism 44 is located at a reference position in an initial state. At the position, images the same as the images when the image rotating adapter 16 is not mounted are formed on the light receiving surfaces of the image pickup devices 54R, 54G, and 54B. Specifically, the subject images formed on the light receiving surface of the image pickup devices 54R, 54G, and 54B are changed in accordance with the rotation position of the second prism 44. Therefore, in the initial state, the second prism 44 is located at the reference position so as to pick up an image the same as the image when the image rotating adapter 16 is not mounted.

As described above, even when the image rotating adapter 16 is mounted on the television camera 12, it is possible to perform normal photographing. With such a configuration, even in the case where photographing is performed by switching between a normal photography mode and a special effect photography mode, it is possible to perform photographing without inconvenient operations and erroneous operations.

Furthermore, when the compulsory erecting button 80a is operated, the second prism 44 is compulsorily returned to the preset erecting position (the reference position). With such a configuration, it is possible to pick up a subject image (a subject image which has no tilt) the same as the image when the image rotating adapter 16 is not mounted.

In addition, to rotate the second prism 44, it is possible to employ various rotation modes. Exemplary various rotation modes include: a mode for rotating the second prism 44 while the right rotation button R or the left rotation button L is pressed; a mode for rotating the prism predetermined number of times when the right rotation button R or left rotation button L is pressed once; a mode for rotating the prism to a preset shot position by pressing the shot button 82a; and the like.

In addition, in a target position setting method of setting the preset function, the position at the current time may be set as the target position, for example, by pressing the shot button for a long time without using the position setting button mentioned above.

As described above, by mounting the image rotating adapter 16 according to the embodiment, it is possible to perform photographing using a special effect that is operable to rotate a subject image as the need arises. In addition, the image rotating adapter 16 can be used in the television camera 12 using the general imaging lens 14. Therefore, it is possible to add a special photographic function to the general television camera system in a simple way.

Even when the image rotating adapter 16 according to the embodiment is mounted on the television camera 12, it is possible to take an image the same as the image when the adapter is not mounted. Therefore, no matter whether the adapter is mounted or not, it is possible to perform photographing with the same operational feeling. Specifically, it is possible to perform a photographing operation the same as the normal photographing operation without performing a reverse processing of the photographed image or an operation of changing a setting for performing the reverse processing. Thereby, it is possible to embody a system easy to use.

Furthermore, the image rotating adapter 16 according to the embodiment is configured so that an image is preliminarily formed in the image rotating adapter 16. In this case, the first prism 42 having an optical path length the same as the optical path length of the color separation prism 52 in the television camera 12 is disposed in the optical path before the image is formed. Thus, it is possible to form a fine image in consideration of aberration and the like. Thereby, it is possible to photograph a fine image with the television camera 12 without deterioration in performance of the imaging lens 14.

Moreover, if only the subject image is just intended to be rotated, a prism (an odd reflection prism) that reflects the subject light odd number of times may be disposed in the course of the optical path to be rotated (in a case where a prism that reflects the subject light odd number of times, it is difficult to rotate the subject image even by rotating the prism).

However, when the odd reflection prism is used, a problem arises that the image after exiting the prism is reversed (becomes a mirror reversed image) with respect to the image before being incident on the prism. Accordingly, the reversed image should be returned to an unreversed image (which is not laterally reversed) in anywhere.

When the reversed image is intended to be returned to the unreversed image, another odd reflection prism may be employed additionally. However, problems arise that a space for disposing the odd reflection prism is needed and a size of an adapter the same kinds as the adapter according to the embodiment of the invention increases.

Furthermore, the photographed image is able to be unreversed by an image processing, but in this case, a problem arises that a function of the image processing should be added to the television camera side.

Meanwhile, when an adapter similar to the adapter according to the embodiment of the invention is disposed between the general imaging lens and the general television camera, the position relation between the imaging lens and the television camera is changed by a thickness of the adapter. Thus, an image forming position of the optical system is deviated.

Accordingly, in the embodiment of the invention, preliminary image formation is performed once in the adapter, and additionally image formation is performed again in the image pickup device in the television camera through the relay optical system.

In this case, when a prism having an optical path length the same as that of the prism (a color separation prism) in the television camera is disposed in the optical path, it is possible to perform image formation in the optimal state in consideration of aberration and the like of the general imaging lens.

In terms of performance, it may be allowed to use a prism having the optical path length the same as that of the prism (a color separation prism) in the television camera, as the prism disposed in the optical path before the image formation. However, in this case, there is a problem that a space for disposing the prism is needed. Also, in the case of using the adapter according to the embodiment of the invention, there is a problem that a size of the adapter increases.

Specifically, as described above, there may be no problem in terms of performance if only there are respectively arranged a prism before preliminary image formation, an odd reflection prism for rotating a subject image, and an odd reflection prism for returning the reversed subject image to the unreversed subject image. However, there is still a problem that a size of the adapter increases.

Accordingly, in the embodiment of the invention, one prism is used as the prism disposed before preliminary image formation and the odd reflection prism for returning the reversed image to the unreversed image. Therefore, it is possible to solve the problem of an increase in size of the adapter mentioned above.

Furthermore, in the image rotating adapter 16 according to the embodiment, the optical path length of the first prism 42 is set equal to the optical path length of the color separation prism 52 in the television camera 12. However, it is not necessary that the optical path length of the first prism 42 is made to completely coincide with the optical path length of the color separation prism 52 in the television camera 12. Accordingly, it is possible to set the optical path lengths to be approximate to each other in an allowable range. Specifically, it is ideal that the optical path length of the first prism 42 coincides with the optical path length of the prism provided in the television camera. However, it may be allowed that difference of the optical path lengths is in the range of ±5 mm, and in this case a fine image can be photographed. Preferably, the optical path length difference of the first prism to the prism provided in the television camera should be set in the range of about ±2 mm.

Moreover, it is also preferred to use a material of the first prism 42 the same as that of the prism provided in the television camera 12. However, it is not necessary to use the same material. Accordingly, it is possible to use different materials for the prisms if the different materials have the same operation effect.

In addition, in the embodiment, the first prism 42 and the second prism 44 are formed as Pechan Prisms. However, kinds of the first prism 42 and the second prism 44 are not limited to this. Specifically, it is allowed to use a prism having different configuration if the prism is configured to reverse and output an image by reflecting the incident light odd number of times. In this case, the second prism 44 is configured so that the incident optical axis and the exit optical axis are located on the same axis. However, it may be allowed that the first prism 42 is configured to have the incident optical axis and the exit optical axis at least parallel to each other. Moreover, it is not necessary for the first prism 42 and the second prism 44 to have the same configuration.

FIG. 6A to 6D are diagrams illustrating exemplary prisms configured to reverse and output an image by reflecting incident light odd number of times as described above.

Figure 6A:
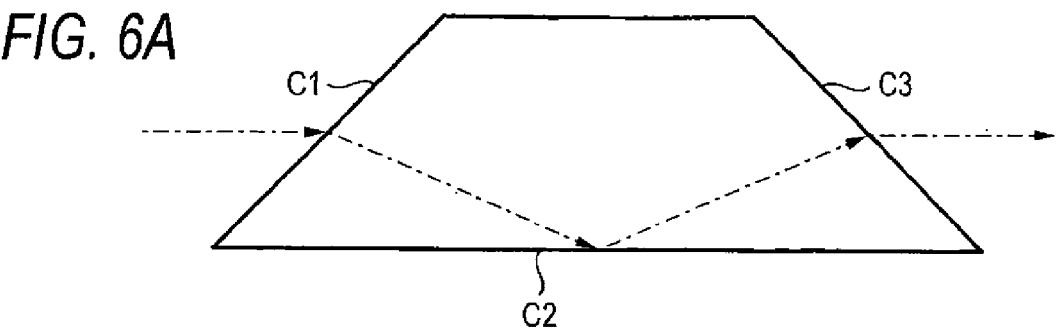
FIGS. 6A, 6B, 6C and 6D are diagrams illustrating examples of available prisms.

In the diagram, FIG. 6A shows a prism (a so-called Dove prism) configured to reverse and output an image by reflecting incident light once. The light incident on a surface C1 is reflected on a surface C2, and subsequently exits from a surface C3.

Figure 6B:
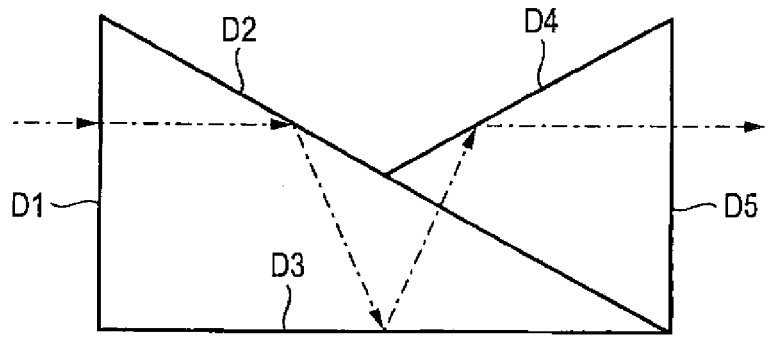
Figure 6C:
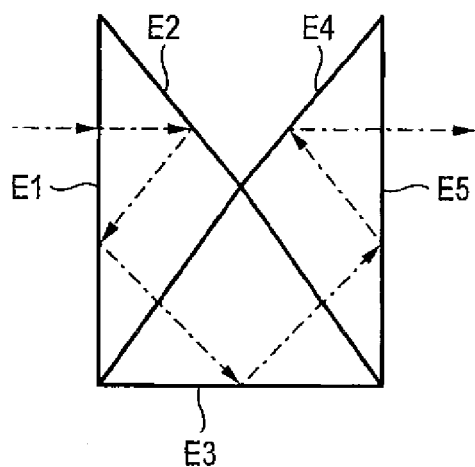

FIG. 6B shows a prism configured to reverse and output an image by reflecting incident light three times. The light incident on a surface D1 is reflected by surfaces D2, D3, and D4, and subsequently exits from a surface D5.

FIG. 5C shows a prism configured to reverse and output an image by reflecting incident light five times. The light incident on a surface E1 is reflected by surfaces E2, E1, E3, E5, and E4, and subsequently exits from a surface E5.

Figure 6D:
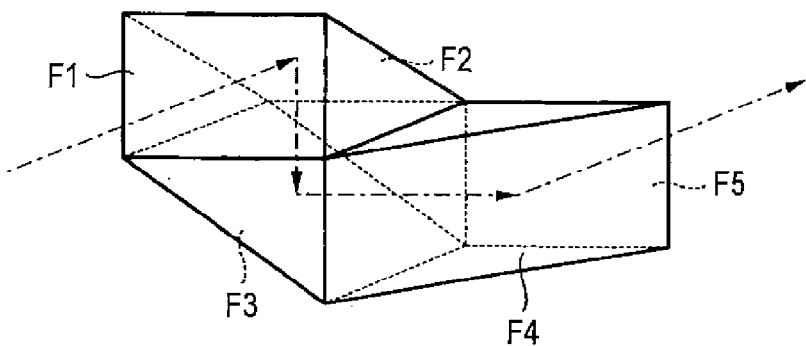

FIG. 6D shows a prism configured to have three triangular prisms combined with each other and to reverse and output an image by reflecting incident light five times. The light incident on a surface F1 is reflected by surfaces F2, F3, and F4, and subsequently exits from a surface F5. In the prism having the configuration mentioned above, optical axes of the light incident on the surface F1 and the light exiting from the surface F5 are parallel to each other, but are not located on the same axis. Accordingly, the prism having the configuration mentioned above can be used in the first prism 42.

Furthermore, in the prism used in the first prism 42 as described above, it is not necessary that the incident optical axis and the exit optical axis are located on the same axis. In addition, it is not necessary that the axes are parallel to each other. Specifically, the first prism 42 may have any configuration so long as the first prism 42 reflects light odd number of times.

As described above, it may be allowed to use a prism having any configuration if the prism is configured to reverse and output an image by reflecting incident light odd number of times.

However, considering compactness of the whole system, it is preferred to use a prism configured to output an image by reflecting incident light at least three times therein. Specifically, by performing reflection many times, it is possible to shorten the total length of a prism in an optical axis direction. Thereby, it is possible to shorten the total length of the image rotating adapter 16.

In particular, it is necessary for the first prism 42 to have an optical path length the same as that of the color separation prism 52. Therefore, to achieve a decrease in size of the whole system under the condition mentioned above, it is preferred to use a prism configured to output an image by reflecting incident light at least three times therein.

Hereinafter, a rotation drive control of the second prism 44 according to the embodiment will be described with reference to flowcharts shown in FIGS. 7 to 10.

Figure 7:
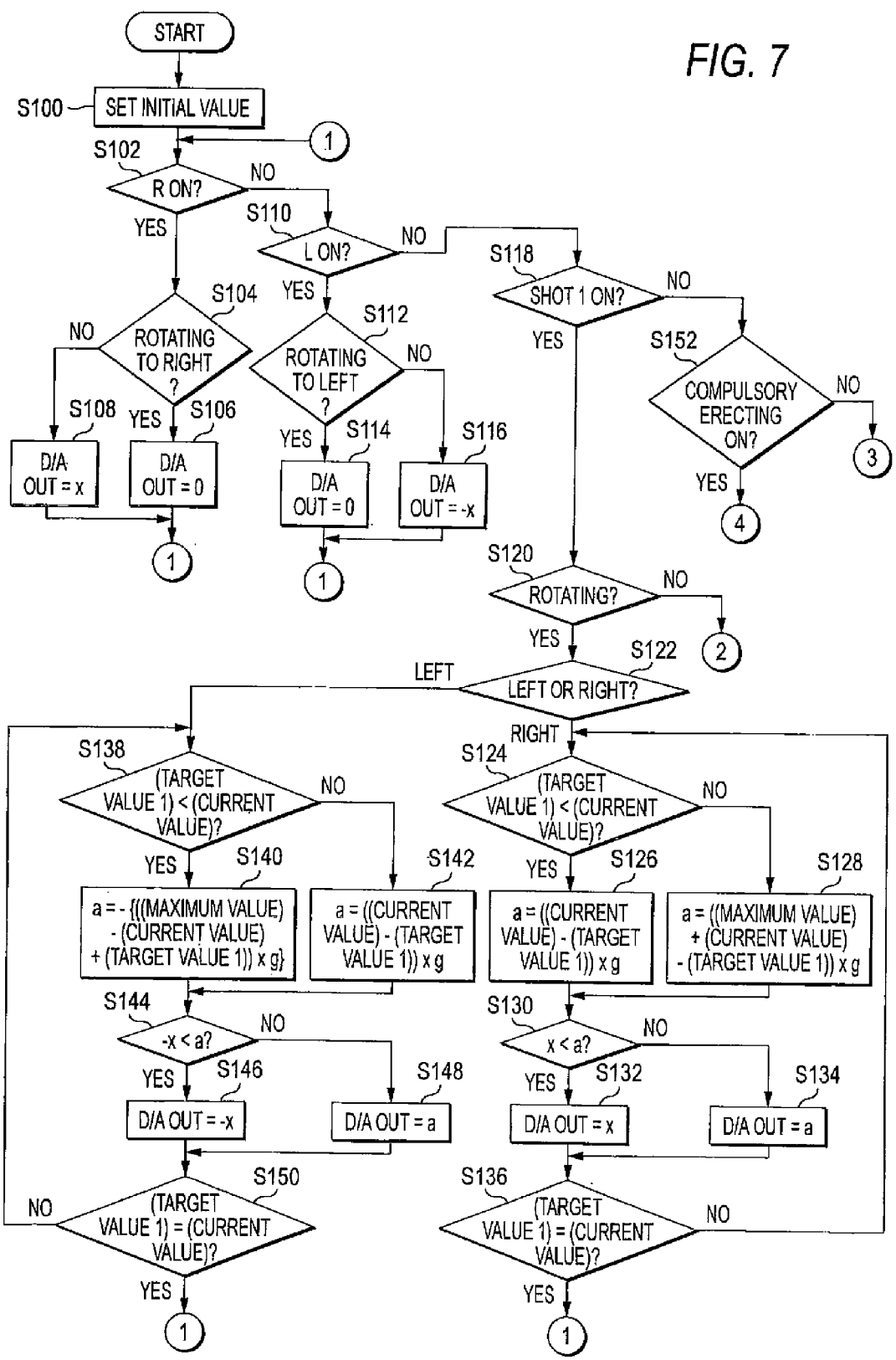
FIG. 7 is a flowchart illustrating a whole flow of the rotation drive control of the second prism according to the first embodiment.

First, values such as various variables are set to initial values in Step S100 shown in FIG. 7.

Next, it is determined whether the right rotation button R is pressed or not in Step S102. If it is determined that the right rotation button R is pressed, it is determined whether the second prism 44 is rotating rightward or not in Step S104. At this time, the rotation direction is determined by the microcomputer 70 in accordance with a detection signal from the encoder 74.

If it is detected that right rotation is being performed, it is the case where when the right button R is already pressed once to perform right rotation, the right rotation button R is pressed again. As mentioned above, in the embodiment, starting and stopping rotation are operable to be controlled by the same button. Therefore, when the right rotation button R is pressed during right rotation, the right rotation is stopped.

Then, in the next Step S106, the microcomputer 70 outputs a signal for setting an output value of the D/A 72 by 0 (OUT=0) to the prism rotation drive motor 68.

On the other hand, if it is determined that not right rotation but left rotation is being performed in Step S104, to perform right rotation, the output value (OUT) is set equal to x in Step S108. That is, OUT=x. Here, the output of the D/A 72 is for a rotation speed of the prism rotation drive motor 68. However, the output varies by adjusting the speed control volume 84, and it is represented by the variable x.

Subsequently, the flow returns to the Step S102 in any case.

Next, if it is determined that the right rotation button R is not pressed in Step S102, it is determined that the left rotation button L is pressed or not in Step S110. If it is determined that the left rotation button L is pressed, it is determined whether the second prism 44 is rotating leftward or not in Step S112. At this time, the rotation direction is determined by the microcomputer 70 in accordance with the detection signal from the encoder 74.

If it is detected that right rotation is being performed, it is the case where when the left rotation button L is already pressed once to perform left rotation, the left rotation button L is pressed again. Therefore, the left rotation is stopped similarly to the case of the right rotation.

Then, in the next Step S114, the microcomputer 70 outputs a signal for setting an output value of the D/A 72 by 0 (OUT=0) to the prism rotation drive motor 68.

On the other hand, if it is determined that not left rotation but right rotation is being performed in Step S112, the output value (OUT) of the D/A 72 is set equal to −x in Step S116 to perform left rotation.

If it is determined that the right left rotation button L is not pressed in Step S110, it is determined whether the shot button 82a is pressed or not in the next Step S118. Here, when it is determined that the shot button 82a is pressed, the second prism 44 is controlled to be rotated and stopped at a shot position (a target value 1) previously set for the shot button 82a as follows (an operation of the preset function).

That is, first in Step S120, it is determined whether the second prism 44 is rotating or not. If rotation is not being performed, the flow proceeds to the flowchart shown in FIG. 8. On the other hand, if rotation is being performed, it is determined whether the rotation direction is a right direction or a left direction. As mentioned above, the rotation direction and a current value are determined by the microcomputer 70 in accordance with the detection signal from the encoder 74.

In the case of the right rotation, the current value is compared with the target value 1 for rotating the second prism 44 in the next Step S124.

Here, in the embodiment, one rotation cycle (0° to 360°) is represented as digital values in the range from 0 to 4095, and the rotation drive is controlled by detecting a direction and a position of rotation. Furthermore, an angle is measured in the anticlockwise direction as usual. In the rotation direction of the second prism 44, right rotation (a positive rotation) is defined as rotation in the clockwise direction, and left rotation (a negative rotation) is defined as rotation in the counterclockwise direction.

If the current value of the second prism 44 is more than the target value 1 in Step S124, now right rotation is being performed. Therefore, when the rotation is kept in a right direction, a rotation angle of the second prism 44 from the current position to the target position is represented by "current value−the target value 1". Accordingly, in Step S126, a=(current value−target value 1)×g. Here, g represents a gain.

In contrast, if the target value 1 is more than the current value in Step S124, a rotation angle of the second prism 44 from the current position to the target position by right rotation is a value obtained by subtracting "target value 1−current value" from one rotation cycle (which is 360° in terms of angle, 4095 in terms of digital value, that is, the maximum value). Accordingly, in Step S128, a={maximum value−(target value 1−current value)}×g =(maximum value+current value−target value 1)×g. Here, g represents a gain.

Next, the just calculated value is compared with a motor rotation speed x (a rotation angle per unit time) adjusted by the speed control volume 84 in Step S130.

As a result from the comparison in Step S130, if a is more than x, an output value (OUT) of the D/A 72 is set equal to x in Step S132. That is, OUT=x. Conversely, if a is not more than x, an output value (OUT) of the D/A 72 is set equal to a in Step S134. That is, OUT=a.

Subsequently, in the state where the second prism 44 is still rotated rightward, it is determined whether the current value is equal to the target value 1 or not in Step S136. If the values are not equal to each other, the flow returns to Step S124, and the preset function is continuously performed. If the current value is equal to the target value 1, an operation of the preset function is terminated, and the flow returns to Step S102.

Furthermore, if it is determined that the rotation direction is a left direction in Step S122, the flow proceeds to Step S138, and the same control in the case of right rotation in Step S124 to Step S136 is performed.

Specifically, first, the target value 1 is compared with the current value in Step S138. If the current value is more than the target value 1, now left rotation is being performed. Therefore, when the rotation is kept in a right direction, a rotation angle of the second prism 44 from the current position to the target position is a value obtained by subtracting "target value 1−current value" from one rotation cycle. Accordingly, in Step S140, a=−{(maximum value −current value+target value 1)×g}.

In contrast, if the current value is not more than the target value 1, a rotation angle from the current position to the target position by left rotation is represented by "target value 1−current value", and now left rotation is being performed. Accordingly, in Step S142, a=(current value−target value 1)×g.

Next, −x and a are compared in Step S144. If a is more than −x, an output value (OUT) of the D/A 72 is set equal to −x in Step S146. That is, OUT=x. Conversely, if a is not more than −x, an output value (OUT) of the D/A 72 is set equal to a in Step S148. That is, OUT=a.

Subsequently, it is determined whether the current value is equal to the target value 1 or not in Step S150. If the values are not equal to each other, the flow returns to Step S138. If the current value is equal to the target value 1, the flow returns to Step S102.

When the preset function is performed by pressing the shot button 82a during rotation of the second prism 44, the control of the second prism 44 is changed from the speed control mentioned above to a position control. Thus, the second prism 44 is controlled to be rotated and stopped at the target position. In this case, it is preferred that the rotation speed should not be changed even when the preset function is performed during rotation. With such a configuration, there is no speed variation even when the preset function is performed during rotation, and thus it is possible to obtain an image free from a sense of incongruity.

Figure 8:
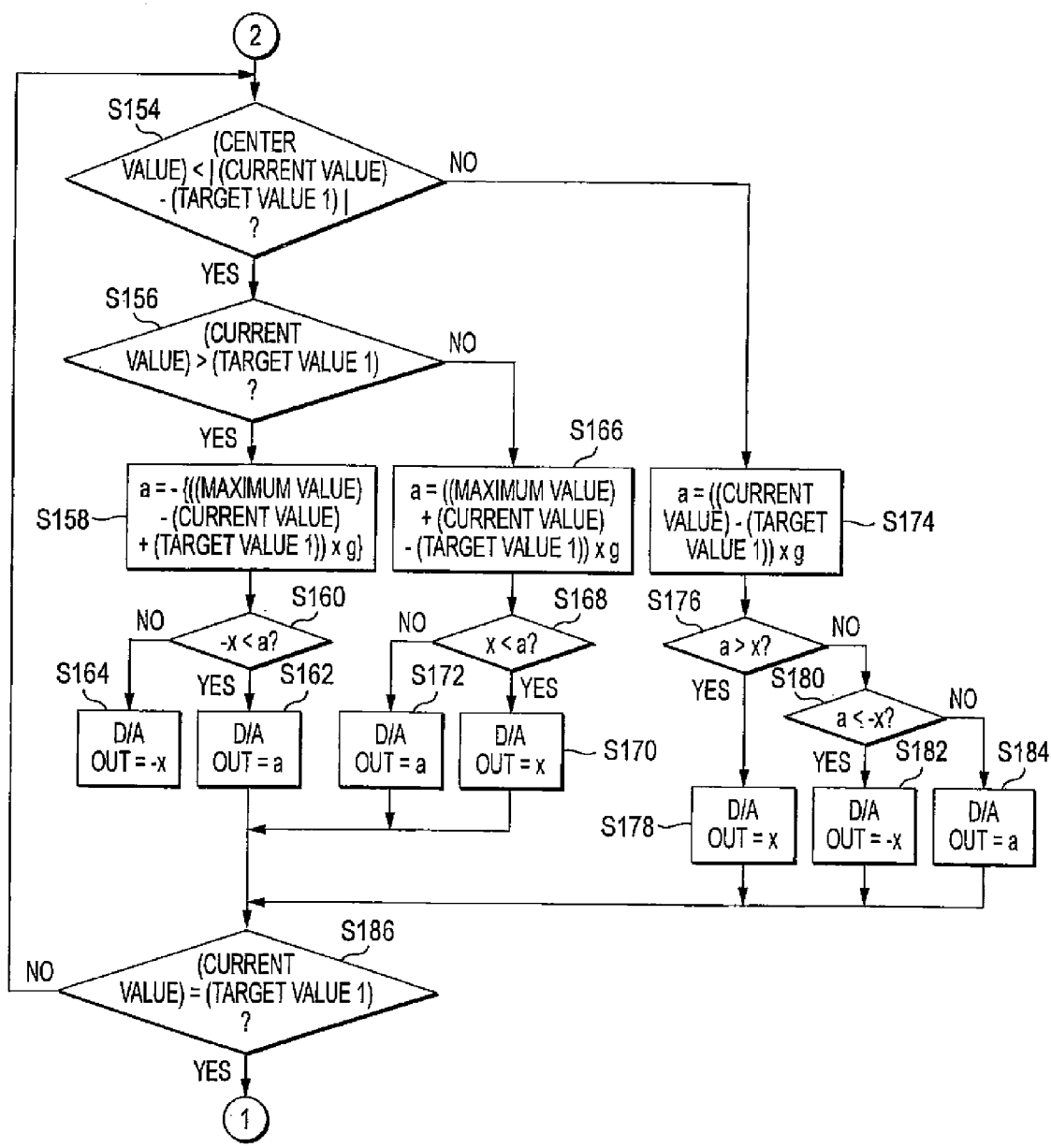
FIG. 8 is a flowchart illustrating a preset function during stop of the second prism.

Meanwhile, if it is determined that the second prism 44 is not rotating but stopping in Step S120, the control of the flowchart shown in FIG. 8 is performed.

The flowchart in FIG. 8 shows a control when the shot button 82a is pressed during stop of the second prism 44.

In this case, in Step S154, when a current position is a position of the second prism 44 directly after the shot button 82a is pressed during stop of rotation, it is determined whether a distance between the set shot position (a target value 1) of the shot button 82a and the current position of the second prism 44 is larger than a half of one rotation cycle or not. That is, the shortest distance in the case of rotation from the current position to the target position is determined. As described above, one rotation cycle (0° to 360°) is represented as digital values in the range from 0 to 4095, and thus a half of one rotation cycle equivalent to 180° is represented as 2047 in terms of a digital value. It is referred to as a central value. In addition, it is determined whether an absolute value of a difference between the current value and the target value 1 is larger than the central value or not in Step S154. Here, angles representing the current value and the target value 1 in the range of 0° to 360° are represented as digital values in the range of 0 to 4095. For example, when the target value 1 is 3000 and the current value is 60°, an absolute value of difference between the current value and the target value 1 is 240°, and thus is more than 180° corresponding to the central value.

If it is determined that the absolute value of difference between the current value and the target value 1 is not more than the central value in Step S154, a difference between the shot position (a target value 1) and the current position of the second prism 44 on a side not having a value of 0 is not more than a half of one rotation cycle. In this case, the flow proceeds to Step S174.

In contrast, if the absolute value of difference between the current value and the target value 1 is more than the central value, a difference between the shot position (a target value 1) and the current position of the second prism 44 on a side not having a value of 0 is more than a half of one rotation cycle. Then, in the next Step S156, the current value and the target value 1 are compared with each other. In the step, if the current value is not more than the target value 1, the flow proceeds to Step S166.

If it is determined that the current value is more than the target value 1 in Step S156, the flow proceeds to Step S158.

In Step S156, if it is determined that the current value is more than the target value 1, a difference between the shot position (a target value 1) and the current position of the second prism 44 on a side not having a value of 0 is more than a half of one rotation cycle. Hence, the difference between the shot position (a target value 1) and the current position of the second prism 44 on a side not having a value of 0 is small, and is defined as the shortest distance between the shot position (a target value 1) and the current position of the second prism 44. Accordingly, in Step S158, the reference sign a represents the expression that a value obtained by subtracting the difference between the current value and the target value 1 from the maximum value (which is equal to a digital value of 4095 representing one rotation cycle) is multiplied by a gain g. That is, a=−{(maximum value−current value +target value 1)×g}.

Subsequently, a is compared with −x in Step S160. In the step, if a is more than −x, an output of the D/A is represented by OUT=a in Step S162. If a is not more than −x, an output of the D/A is represented by OUT=−x in Step S164. Then, the flow proceeds to Step S186.

In contrast, if it is determined that the current value is not more than the target value 1 in Step S156, a is calculated as a solution of the expression that a value obtained by subtracting the difference between the target value 1 and the current value from the maximum value is multiplied by a gain g in Step S166. That is, a=(maximum value+current value−target value 1)×g.

Subsequently, a is compared with x in Step S168. In the step, if a is more than x, an output of the D/A is represented by OUT=x in Step S170. If a is not more than x, an output of the D/A is represented by OUT=a in Step S172. Then, the flow proceeds to Step S186.

In addition, If the absolute value of difference between the current value and the target value 1 is not more than the central value in Step S154, a=(current value−target value 1)×g in Step S174. Here, g represents a gain.

Next, a is compared with x in Step S176. If a is more than x, an output of the D/A 72 is represented by OUT=x in Step S178.

In contrast, if a is not more than x in Step S176, a is compared with −x in Step S180. If −x is more than a, an output of the D/A 72 is represented by OUT=−x in Step S182. If −x is not more than a, an output of the D/A 72 is represented by OUT=a in Step S184.

Then, the flow proceeds to Step S186. In the step, it is determined whether the current value is equal to the target value 1 or not. If the current value is equal to the target value 1, a shot function (the preset function) is terminated, and the flow returns to Step S102 in FIG. 7. Conversely, if the current value is not equal to the target value 1, the flow returns to Step S154, and the control is continuously performed.

As described above, when the preset function is performed during stop of the prism, rotation is controlled to be performed in a direction of the shortest distance by the position control, and is stopped at the target position.

Here, for explanatory convenience, one shot button and one preset function are provided. However, when the plural preset functions such as SHOT1, SHOT2, and the like are provided, sometimes the other preset function may be performed during operation of the one preset function. In this case, it is preferred that the one preset function should be switched into the other preset function.

Furthermore, if it is determined that the shot button 82a is not pressed in Step S118 of the flowchart in FIG. 7, it is determined whether the compulsory erecting button 80a is pressed or not in Step S152.

Figure 9:
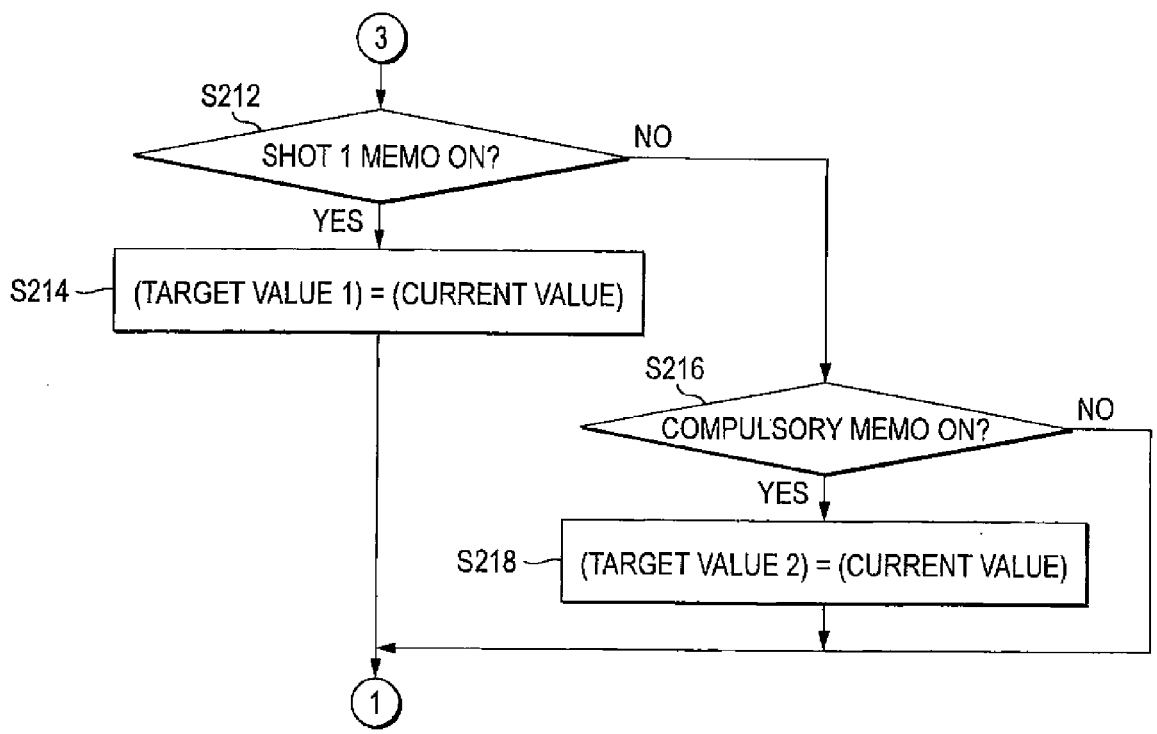
FIG. 9 is a flowchart illustrating a flow for setting a target position and a compulsory erecting position.
Figure 10:
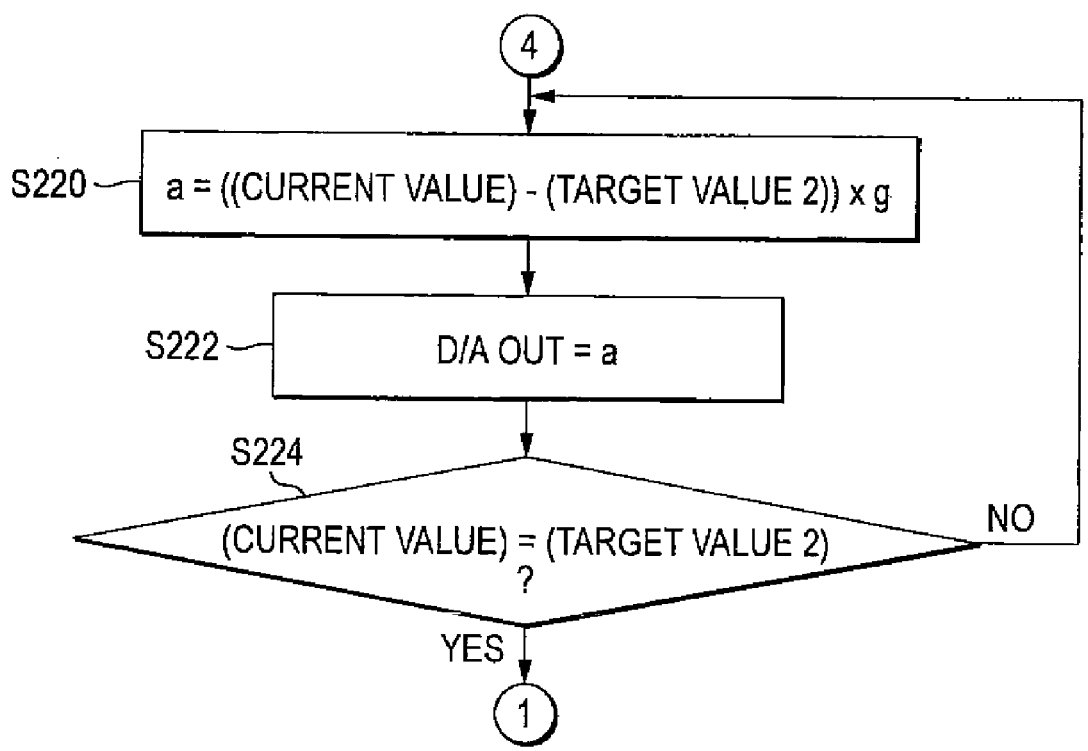
FIG. 10 is a flowchart illustrating a control of a compulsory erecting function according to the first embodiment.

As a result of the determination, if the compulsory erecting button 80a is not pressed, the flow proceeds to the flowchart representing a control in a case where a compulsory erecting function is turned OFF as shown in FIG. 9. In contrast, if the compulsory erecting button 80a is pressed, the flow proceeds to the flowchart representing a control in a case where the compulsory erecting function is turned ON as shown in FIG. 10.

If the compulsory erecting button 80a is not pressed in Step S152 in FIG. 7, that is, if it is determined that the compulsory erecting function is turned OFF, the control in the case of compulsory erecting function OFF is performed in accordance with the flowchart in FIG. 9. Specifically, it is determined whether the shot position setting button (SHOT1 MEMO) 82b is pressed or not in Step S212 in FIG. 9. If the shot position setting button 82b is pressed, the current value is set as the target value 1 of the shot position in Step S214. The set target value 1 is stored in the memory 88.

Meanwhile, if the shot position setting button 82b is not pressed, it is determined whether the compulsory erecting position setting button (COMPULSORY ERECTING MEMO) 80b is pressed or not in the next Step S216. If the compulsory erecting position setting button 80b is pressed, the current value is set as the target value 2 of the compulsory erecting position in Step S218. The set target value 2 is stored in the memory 88.

As described above, the compulsory erecting position is can be updated. In this case, it is preferred that the update of the compulsory erecting position be more difficult than the setting of the shot position.

In contrast, if the compulsory erecting position setting button 80b is not pressed, it means that no button is pressed as a whole, and thus the flow returns without performing anything to Step S102 of the flowchart in FIG. 7.

Furthermore, if the compulsory erecting button 80a is pressed in Step S152 in FIG. 7, that is, if it is determined that the compulsory erecting function is turned ON, the control in the case of compulsory erecting function ON is performed in accordance with the flowchart in FIG. 10.

In the case of compulsory erecting function ON, that is, if the compulsory erecting button 80a is pressed, the second prism 44 is compulsorily rotated to the preset erecting position. Hence, a value of a is calculated by multiplying a gain g by the difference between the current value and the target value 2 in Step S220. Then, the value of a is set as an output of the D/A, that is, OUT=a in Step S222.

In Step S224, it is determined whether the current value is equal to the target value 2 or not. If the current value is equal to the target value 2, it means that the current position reaches the erecting position, and thus the control of the compulsory erecting is terminated. Then, the flow returns to Step S102 of the flowchart in FIG. 7. Conversely, if the current value is not equal to the target value 2, the flow returns to Step S220. Then, a value of a is calculated again, and the control is continuously performed again.

Furthermore, when the compulsory erecting function is performed, it is preferred that the prism be rotated at the maximum speed.

In the embodiment as described above, a preset function (a shot position) is set, a position at which the second prism 44 is intended to be stopped is previously stored, and a rotation speed at the current time is operable to be adjusted by the speed control volume 84 by switching to the position control when the preset function is performed. Thus, when the second prism 44 is intended to be rotated so as for an image to be rotated in some angular range, it is possible to smoothly stop at the target position.

In addition, when the preset function (a shot function) is performed during stop of the optical system, rotation thereof is controlled to be performed in a direction of the shortest distance and to be stopped at the target position by the position control. When the preset function is performed during rotation of the optical system, control is changed from the speed control to the position control, and thus rotation thereof is controlled to be rotated with a rotation direction kept and to be stopped at the target position.

Furthermore, as described in the embodiment, one shot button and one preset function are provided. However, it is preferred that plural preset functions should be provided.

When the plural preset functions are provided, sometimes the other preset function may be performed during operation of one preset function. In this case, it is preferred that the current preset function should be switched into the last preset function.

In the embodiment, as described in the flowchart in FIG. 10, it is possible to update the compulsory erecting position, and the compulsory erecting position is not fixed, but stored as one type of the preset functions. In this case, as described above, it is preferred that the update of the compulsory erecting position be more difficult than the setting of the shot position.

Furthermore, when the compulsory erecting function is performed, it is preferred that the prism be rotated at the maximum speed. In the embodiment, basically rotation of the prism is determined by the speed control volume, but the prism is moved at the maximum speed when being moved to the compulsory erecting position. In this case, the prism may be configured to be moved to the compulsory erecting position at a speed of the speed control volume instead of the maximum speed.

Alternatively, those may be configured to be switched to each other.

Furthermore, when the prism is rotated by pressing the right rotation button R or the left rotation button L, sometimes the preset function may be performed. Even in this case, the prism is rotated to the target position at the same rotation speed, and the rotation speed is configured to be not changed. The reason is that the prism should be basically moved at a speed adjusted by the speed control volume, and a sense of incongruity according to speed variation caused by operation of the preset function when the prism is rotated at an optional speed should be prevented.

In addition, when the right rotation button R or the left rotation button L is pressed, or when the preset function is being performed, it is preferred that a rotation speed be operable to be adjusted by the speed control volume.

Figure 11:
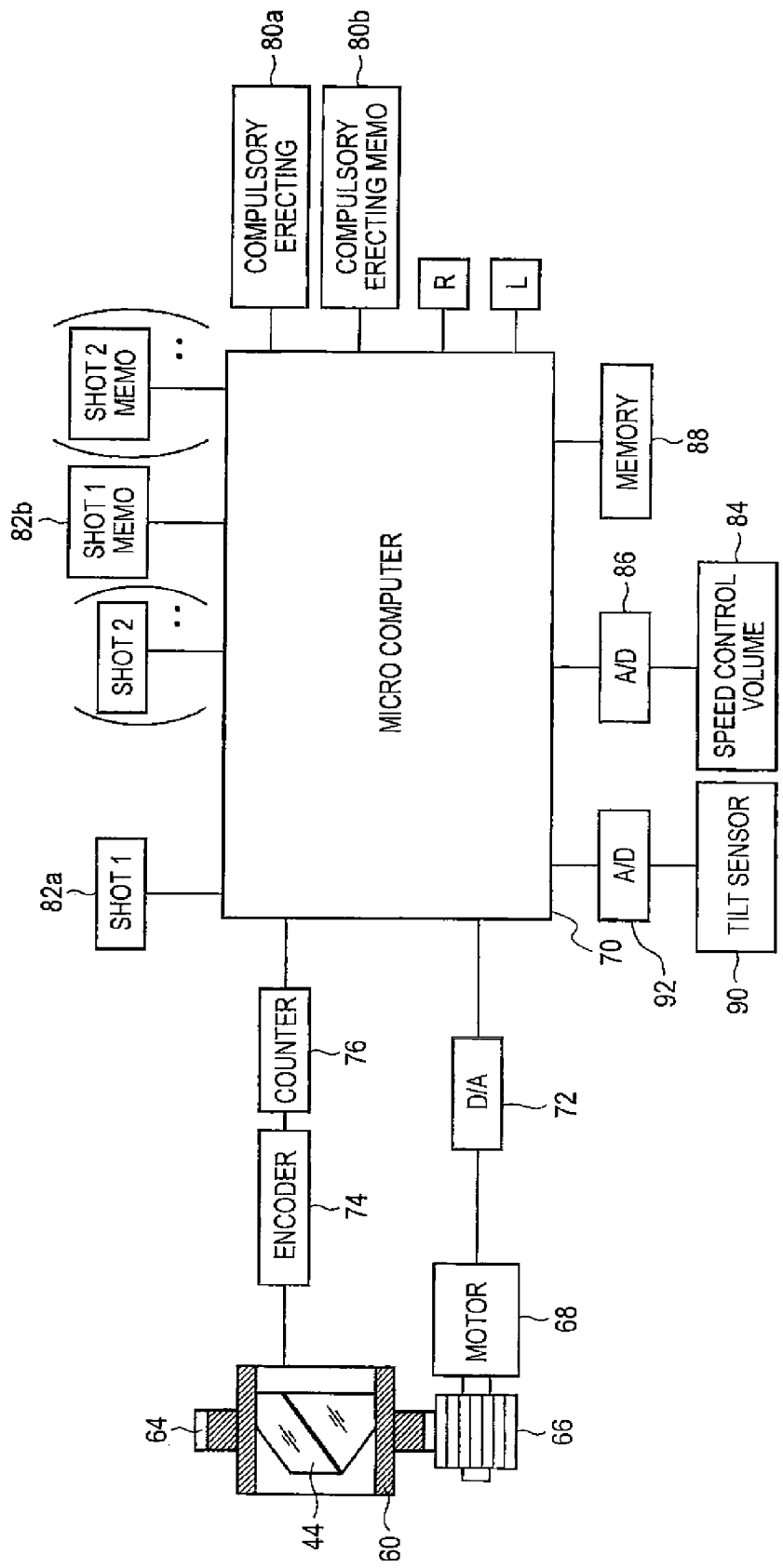
FIG. 11 is a schematic block diagram illustrating a rotation drive control system for rotating the second prism around an optical axis according to a second embodiment.

Next, a second embodiment will be described. In the embodiment, as shown in FIG. 11, there are further provided a tilt sensor 90 for detecting tilt of the camera main body, an A/D 92 for converting an analog signal which is a signal of the detection into a digital signal and inputting the digital signal to the microcomputer 70, and the like, in addition to the rotation drive control system according to the first embodiment.

Figure 12:
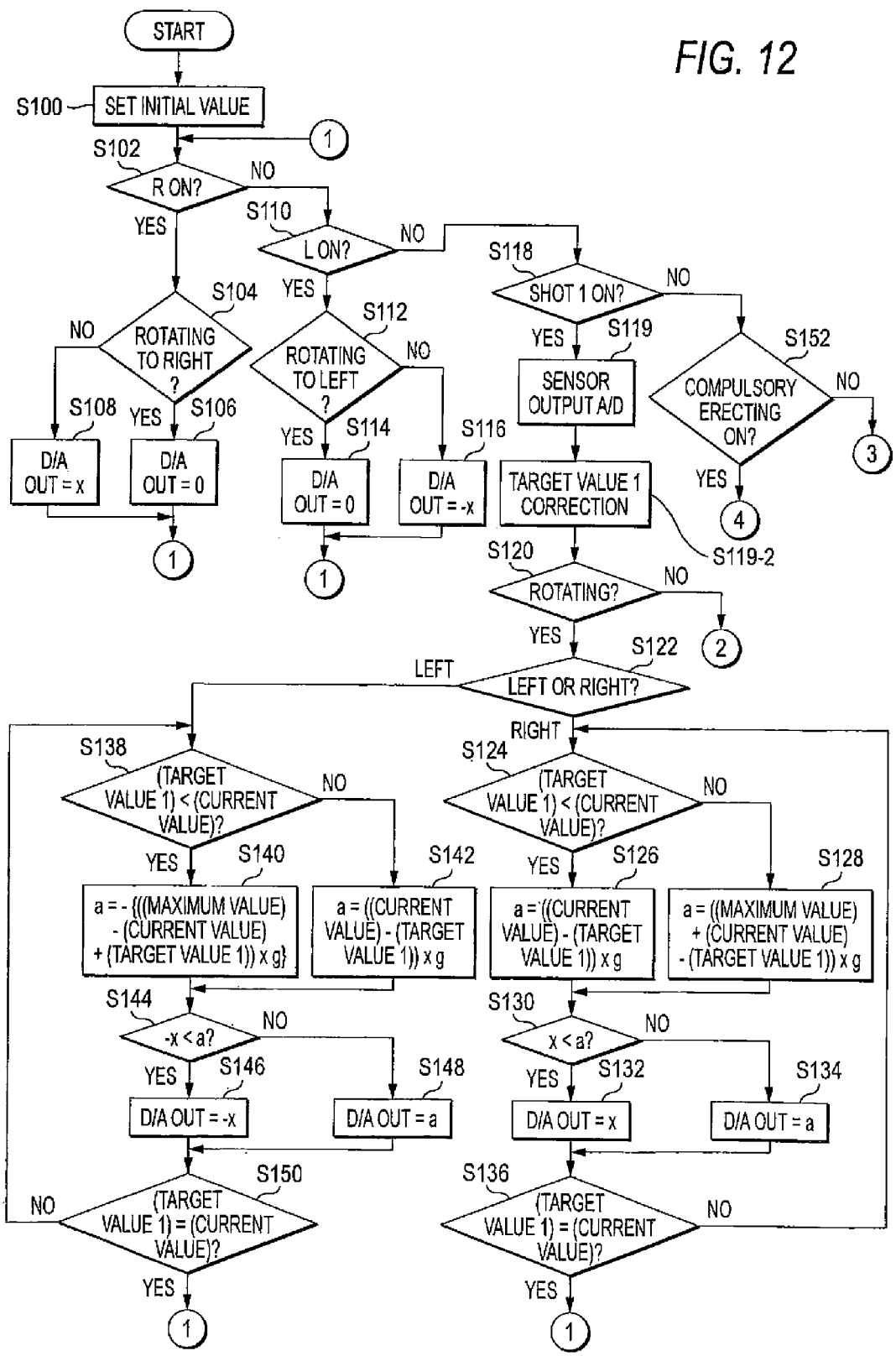
FIG. 12 is a flowchart illustrating a whole flow of the rotation drive control of the second prism according to the second embodiment.

Hereinafter, a rotation drive control of the second prism 44 according to the embodiment will be described centering on differences from the first embodiment with reference to the flowcharts shown in FIGS. 12 and 13.

Contrary to the first embodiment, if the detection signal indicating tilt of the camera, detected by the tilt sensor 90, and converted into digital signal by the A/D 92 is received by the microcomputer 70 in Step S119, the microcomputer 70 corrects the set target value 1 on the basis of the detected tilt in the next Step S119-2. As might be expected, if the detected tilt is 0, the correction is not performed.

Figure 13:
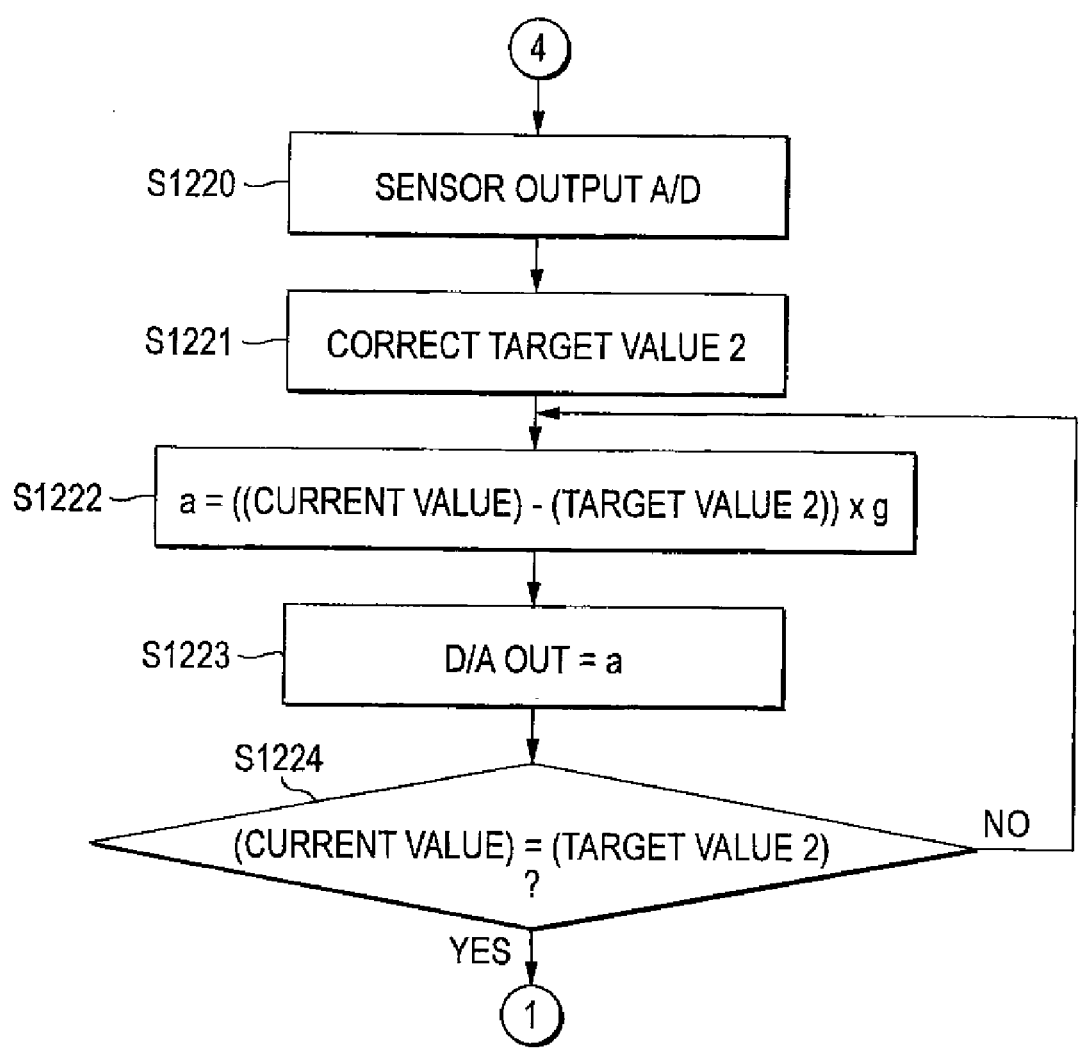
FIG. 13 is a flowchart illustrating a control of a compulsory erecting function according to the second embodiment.

Furthermore, contrary to the first embodiment, if the compulsory erecting button 80a is pressed in Step S152, that is, if it is determined that the compulsory erecting function is turned ON, the control in the case of compulsory erecting function ON is performed in accordance with the flowchart in FIG. 13.

In contrast, if the compulsory erecting function is turned ON, that is, if the compulsory erecting button 80a is pressed, the second prism 44 is compulsorily rotated to the preset erecting position.

First, the detection signal indicating tilt of the camera, detected by the tilt sensor 90, and converted into digital signal by the A/D 92 is input to the microcomputer 70 in Step S1220. Then, in Step S1221, the microcomputer 70 corrects the set target value 2 on the basis of the detected tilt. If the detected tilt is 0, the correction is not performed.

Subsequently, a value of a is calculated by multiplying a gain g by the difference between the current value and the target value 2 in Step S1222. Then, the value of a is set as an output of the D/A, that is, OUT=a in Step S1223.

Next, it is determined whether the current value is equal to the target value 2 or not in Step S1224. If the current value is equal to the target value 2, it means that the current position reaches the erecting position, and thus the control of the compulsory erecting is terminated. Then, the flow returns to Step S102 of the flowchart in FIG. 12. Conversely, if the current value is not equal to the target value 2, the flow returns to Step S1222. Then, a value of a is calculated again, and the control is continuously performed again.

Furthermore, when the compulsory erecting function is performed, it is preferred that the prism be rotated at the maximum speed.

In the embodiment as described above, a preset function (a shot position) is set, a position at which the second prism 44 is intended to be stopped is previously stored, the set value is corrected on the basis of the camera tilt detected by the tilt sensor 90 additionally, and a rotation speed at the current time is operable to be adjusted by the speed control volume 84 by switching to the position control when the preset function is performed. Thus, when the second prism 44 is intended to be rotated so as for an image to be rotated in some angular range, it is possible to smoothly and precisely stop at the target position even in a state where the camera is tilted.

Next, modified examples of the television camera system based on a camera having the image rotating adapter according to the first and second embodiments will be described. The description hereinafter centers on differences from the television camera system in FIGS. 1A to 1C.

Figure 14A:
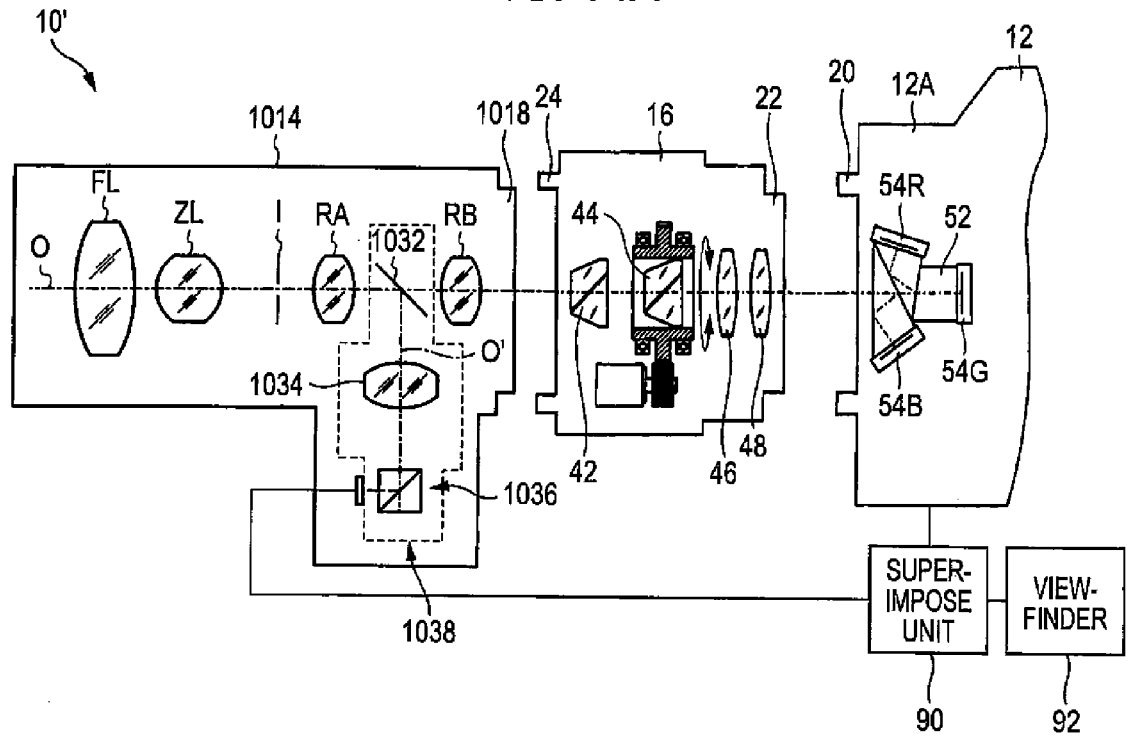
FIGS. 14A and 14B are system configuration diagrams illustrating a modified example of the TV camera system.
Figure 14B:
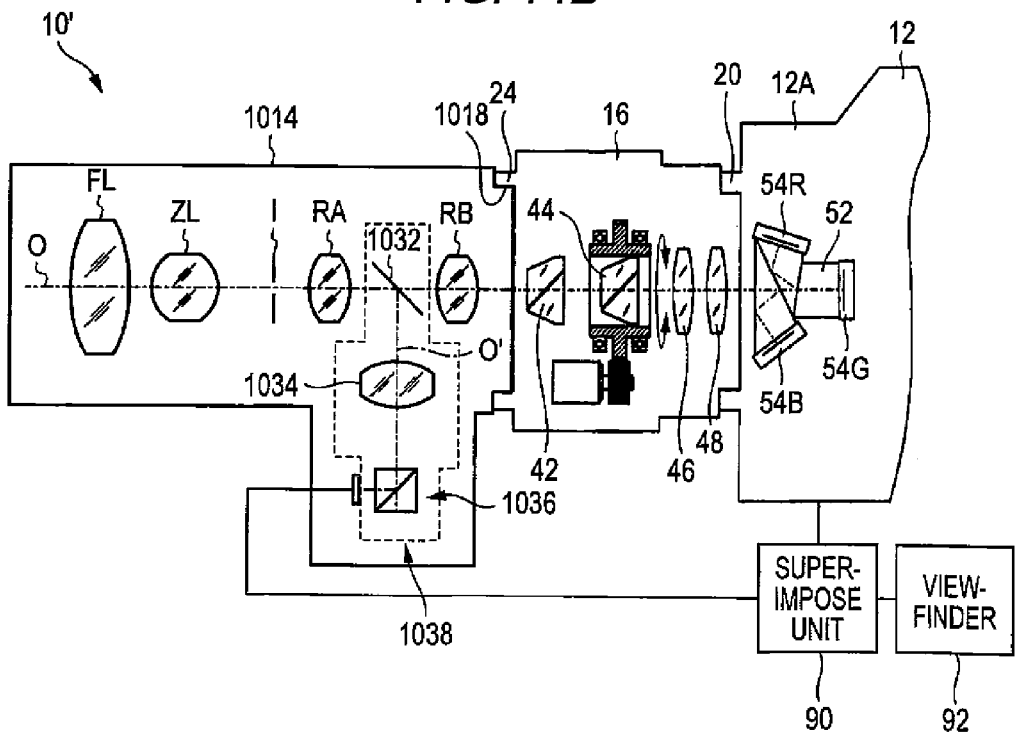

FIGS. 14A and 14B are system configuration diagrams illustrating modified examples of the television camera system based on the camera having the image rotating adapter according to the first and second embodiments.

As shown in FIG. 14A, a television camera system 10' includes a television camera 12, an imaging lens 1014, an image rotating adapter 16, a superimposing unit 90, and a viewfinder 92.

The image rotating adapter 16 is an adapter for rotating an image photographed by the television camera 12 to apply a special effect to the image. The adapter is mounted between the television camera 12 and the imaging lens 1014 as the need arises. Specifically, as shown in FIG. 14B, when an image is intended to be rotated for a special effect, the image rotating adapter 16 is mounted between the television camera 12 and the imaging lens 1014. In contrast, when special effect photographing is not performed, the adapter is detached from the television camera 12, and the imaging lens 1014 is directly mounted on the television camera 12.

Furthermore, the imaging lens 1014 has a lens side mount 1018 provided on the tail end thereof, and is mounted on a camera main body 12A by attaching the lens side mount 1018 to the camera side mount 20. The camera side mount 20 is provided on the leading end of the camera main body 12A of the television camera 12.

Figure 15:
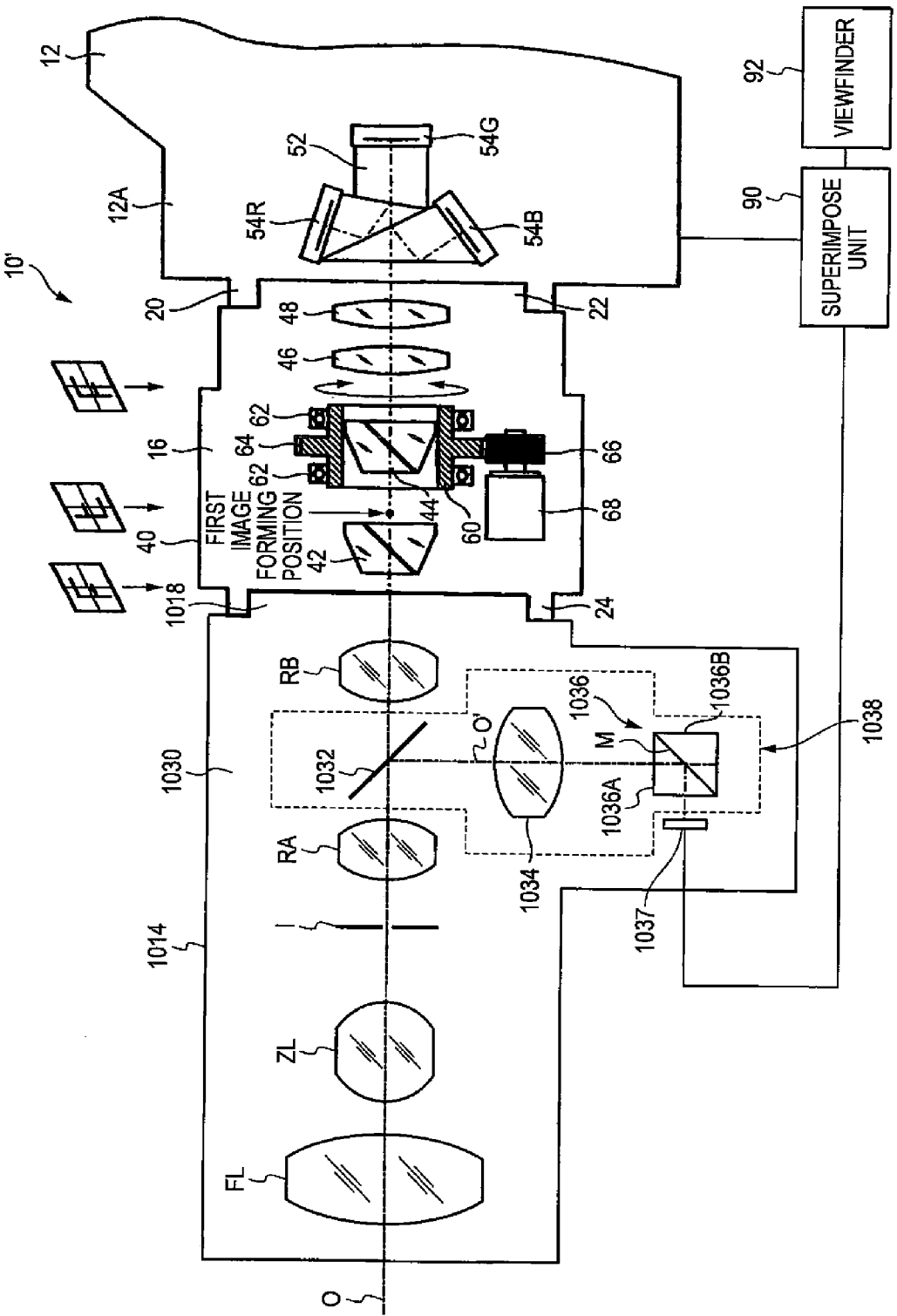
FIG. 15 is a schematic configuration diagram illustrating an optical system of the television camera system shown in FIGS. 14A and 14B.

As shown in FIG. 15, in a lens barrel 1030 of the imaging lens 1014, there are arranged on the optical axis O in order from the left side, a focus lens (group) FL, a zoom lens (group) ZL, an iris I, a relay lens (a relay optical system) formed of a front side relay lens RA and a rear side relay lens RB, and the like. A subject light incident from the leading of the imaging lens 1014 is transmitted through the lenses to exit from the tail end of the imaging lens 1014.

On the other hand, a half mirror 1032 is disposed between the front side relay lens RA and the rear side relay lens RB of the relay optical system of the imaging lens 1014. The half mirror 1032 separates the optical path of the imaging lens 1014 into two. A part of the subject light incident on the imaging lens 1014 is transmitted through the half mirror 1032. The transmitted subject light is guided from the image rotating adapter 16 to the camera main body 12A along the optical path of the optical axis O as described above. The subject light reflected on the half mirror 1032 is guided along an optical path (an optical path for superimposition) of an optical axis O' which is substantially perpendicular to the optical axis O. In addition, for example, subject light having a light amount of about 50% of the subject light incident on the half mirror 1032 is transmitted through the half mirror 1032. However, it may be possible to use a mirror having characteristics of an optional transmittance and an optional reflectance as the half mirror 1032.

In the optical path for superposition, there are arranged a relay lens 1034 corresponding to the rear side relay lens RB, a beam splitting optical system 1036 formed of two prisms including a first prism 1036A and a second prism 1036B, and a CCD 1037 for superimposition. The subject light reflected on the half mirror 1032 and guided into the optical path for the superimposition is transmitted through the relay lens 1034, and subsequently is incident on the beam splitting optical system 1036. The subject light incident on the beam splitting optical system 1036 is separated into two subject light beams having the same light amount by a half mirror M of a portion at which the first prism 1036 A and the second prism 1036B are bonded. The subject light reflected on the half mirror surface is incident on the image pickup surface of the CCD 1037 for superimposition.

As described above, an optical system 1038 including the half mirror 1032, the relay lens 1034, and the beam splitting optical system 1036 extracts the subject light (the subject image) incident on the imaging lens 1014 before the subject light is incident on the image rotating adapter 16. The subject image before being incident on the image rotating adapter 16 (before rotation) is detected by the CCD 1037 for superimposition, and is sent to the superimposing unit 90.

In the superimposing unit 90, the subject image which is sent from the CCD 1037 for superimposition before being rotated is superimposed upon the rotated subject image photographed by the camera main body 12A.

Figure 16:
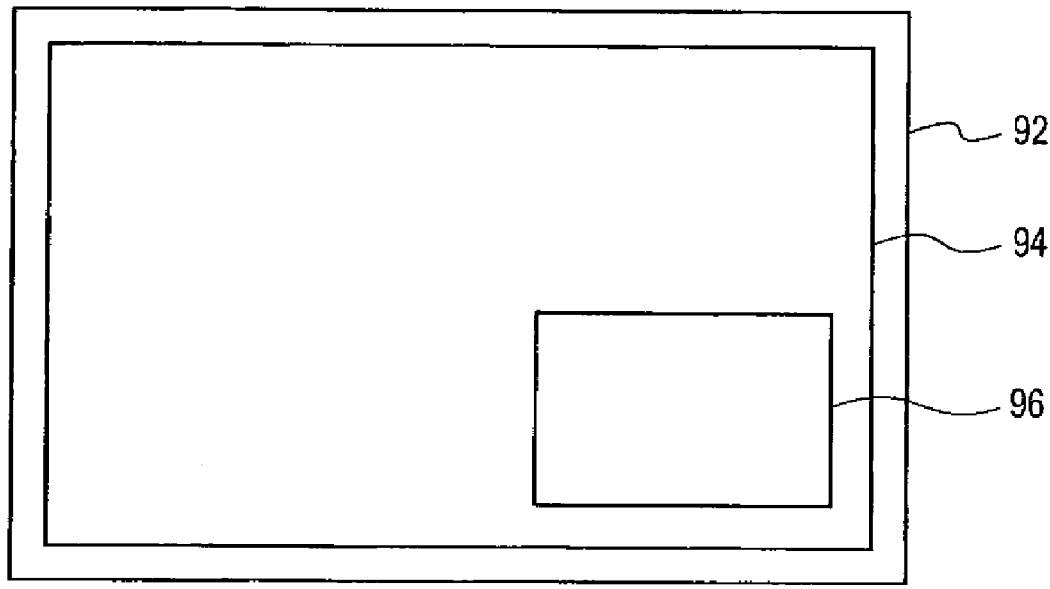
FIG. 16 is an explanatory diagram illustrating an example of superimposition displayed on a viewfinder.
Figure 17A:
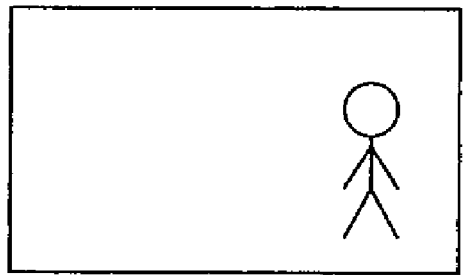
FIGS. 17A and 17B are explanatory diagrams illustrating a problem encountered when a subject image is rotated and displayed.
Figure 17B:
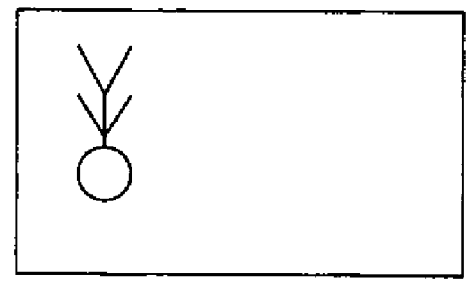

Subsequently, the image on which the subject image before rotation is superimposed is displayed on the viewfinder 92. FIG. 16 shows an example of the superimposed image. As shown in FIG. 16, the viewfinder 92 displays an image 94 which is rotated by the image rotating adapter 16 and is photographed by the camera main body 12A. In the image, a smaller image 96 before rotation is displayed below the right side.

As described above, the image 96 before rotation is configured to be displayed on the viewfinder 92, and thus an operator (a cameraman) can exactly recognize a state of the subject. Therefore, the operator may rarely make an error in camera operation.

Furthermore, a way of superimposition is not limited to the example shown in FIG. 16, and may be modified in various forms. In addition, the photographed image 94 and the image 96 before rotation may be switched to each other to be displayed on the viewfinder 92. However, in this case, it is preferred that characters and the like for allowing an operator to know whether the currently displayed image is the photographed image after rotation or the image before rotation should be displayed on the viewfinder 92.

Furthermore, while the subject image is rotating, the subject image before rotation may be superimposed all the time, and the photographed image and the subject image before rotation may be displayed by being switched to each other. Alternatively, when an operator does not want the superimposing function, a switch for canceling superimposition may be provided.

Furthermore, the spectral optical system is used to obtain the subject light before being incident on the image rotating adapter as the subject image before rotation. However, the image before rotation may be generated by an image processing from the subject image which is rotated by the image rotating adapter and is photographed by the camera main body, instead of being obtained optically as described above.

Specifically, when the subject image is rotated by the image rotating adapter, a rotation angle of the image is able to be detected by an encoder. Therefore, it is possible to obtain the image before rotation in a way that performs the image processing to return the photographed image to it original state just as much as the rotation angle.

As described above, the image rotating adapter and the camera having the image rotating adapter according to the embodiments of the invention has been described in detail. However, the invention is not limited to the examples mentioned above, and it is apparent that various modifications, derivations, and variations may be made without departing from the technical scope of the invention.

What is claimed is:

1. An image rotating adapter, a camera that includes a camera body, an imaging lens detachably mounted to the camera main body, the image rotating adapter detachably mounted between the imaging lens and the camera main body, wherein a subject image passing through the imaging lens is formed on a light receiving surface of an image pickup device through a prism built in the camera main body, and the image rotating adapter rotates the subject image formed on the light receiving surface of the image pickup device, the image rotating adapter comprising:

a first prism that has an optical path length approximate to the optical path of the prism built in the camera main body, wherein the first prism is disposed in an optical path before the subject image passing through the imaging lens is formed on a position in the image rotating adapter, and the first prism reflects subject light passing through the imaging lens odd number of times, and reverses the subject image passing through the imaging lens;

a second prism that has the incident optical axis and the exit optical axis formed on the same axis, wherein the second prism is disposed on an optical axis of the subject light after the subject image is formed once through the first prism, the second prism is supported to freely rotate around the optical axis, and the second prism reflects the subject light passing through the first prism odd number of times and further reverses the subject image reversed by the first prism;

a relay optical system that forms again the subject image passing through the second prism on the light receiving surface of the image pickup device;

a rotation drive unit that rotates the second prism;

a control unit that controls the rotation drive unit;

a rotation instruction unit that instructs the control unit to start or stop rotation;

a target position setting unit that previously sets one or more target positions to stop the second prism;

a preset instruction unit that instructs the control unit to perform a preset function for moving the second prism to the target position; and a detection unit that detects a rotation position and a rotation direction of the second prism, wherein the control unit performs a position control to move the second prism to the target position by the rotation drive unit based on the detection result of the detection unit when being instructed to perform the preset function.

2. The image rotating adapter according to claim 1, further comprising:

a speed control unit that adjusts a rotation speed of the second prism, wherein the speed control unit is adapted to adjust rotation speed when the second prism moves to the target position.

3. The image rotating adapter according to claim 1, wherein the control unit performs the position control to stop the second prism at the target position by rotating in a direction of a shortest distance when being instructed to perform the preset function during stop of the second prism, and the control unit performs the position control to stop the second prism at the target position while keeping the rotation direction of the second prism when being instructed to perform the preset function during rotation of the prism.

4. The image rotating adapter according to claim 1, wherein the control unit performs the position control to keep a rotation speed of the second prism when the preset function is performed during rotation of the second prism.

5. The image rotating adapter according to claim 2, wherein the speed control unit is adapted to adjust the rotation speed of the second prism during rotation of the second prism or during operation of the preset function.

6. The image rotating adapter according to claim 1, further comprising:

a compulsory erecting instruction unit that instructs the control unit to perform a compulsory erecting function for compulsorily moving the second prism to an erecting position at which the subject image is erected; and an erecting position setting unit that previously sets the erecting position, wherein the control unit performs the position control to move the second prism to the erecting position when being instructed to perform the compulsory erecting function, and the compulsory erecting position is able to be updated.

7. The image rotating adapter according to claim 6, further comprising:

a tilt sensor that senses a tilt of the camera main body, wherein the control unit is adapted to correct the set erecting position when tilt of the camera main body is detected.

8. A camera comprising:

the image rotating adapter according to claim 1;

a viewfinder that displays a taken image formed on the light receiving surface of the image pickup device of the camera main body; and a display mechanism that displays on the viewfinder by combining or changing the subject image with the taken image, the subject image being incident on the imaging lens before being incident on the image rotating adapter, wherein the subject image before being incident on the image rotating adapter is combined or changed with the taken image to be displayed on the viewfinder.

9. The camera according to claim 8, wherein the display mechanism includes:

an optical system that extracting the subject image incident on the imaging lens before the subject image is incident on the image rotating adapter; and a superimpose section that superimposes the subject image extracted by the optical system on the taken image.

* * * * *